United States Patent
Yamazaki

(10) Patent No.: US 10,135,091 B2
(45) Date of Patent: Nov. 20, 2018

(54) SOLID ELECTROLYTE BATTERY, ELECTRODE ASSEMBLY, COMPOSITE SOLID ELECTROLYTE, AND METHOD FOR PRODUCING SOLID ELECTROLYTE BATTERY

(71) Applicant: SEIKO EPSON CORPORATION, Tokyo (JP)

(72) Inventor: Yasushi Yamazaki, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 117 days.

(21) Appl. No.: 15/145,263

(22) Filed: May 3, 2016

(65) Prior Publication Data

US 2016/0336617 A1    Nov. 17, 2016

(30) Foreign Application Priority Data

May 15, 2015  (JP) .................................. 2015-099783

(51) Int. Cl.
*H01M 10/0562*    (2010.01)
*H01M 4/131*      (2010.01)
(Continued)

(52) U.S. Cl.
CPC ....... *H01M 10/0562* (2013.01); *H01M 4/131* (2013.01); *H01M 4/485* (2013.01);
(Continued)

(58) Field of Classification Search
CPC .. H01M 10/0562; H01M 4/131; H01M 4/485; H01M 10/052; H01M 10/0525;
(Continued)

(56) References Cited

U.S. PATENT DOCUMENTS

2004/0096745 A1    5/2004  Shibano et al.
2006/0210882 A1*   9/2006  Ugaji ..................... H01B 1/122
                                                    429/322
(Continued)

FOREIGN PATENT DOCUMENTS

DE    19735803 A1     2/1999
JP    05054712 A  *   3/1993
(Continued)

OTHER PUBLICATIONS

Oct. 11, 2016 Partial European Search Report issued in European Patent Application No. 16169582.0.
(Continued)

*Primary Examiner* — Gregg Cantelmo
(74) *Attorney, Agent, or Firm* — Oliff PLC

(57) ABSTRACT

A lithium secondary battery (solid electrolyte battery) includes a positive electrode which includes a positive electrode active material layer containing lithium oxide, a negative electrode which includes a negative electrode active material layer, a first solid electrolyte layer which is provided in contact with the positive electrode active material layer between the positive electrode and the negative electrode and contains lithium and oxygen, and a second solid electrolyte layer which is provided in contact with the negative electrode active material layer between the positive electrode and the negative electrode and contains lithium, nitrogen, and oxygen. It is preferred that each of the first solid electrolyte layer and the second solid electrolyte layer further contains boron.

9 Claims, 9 Drawing Sheets

(51) Int. Cl.
*H01M 4/485* (2010.01)
*H01M 10/052* (2010.01)
*H01M 10/0525* (2010.01)
*H01M 10/0585* (2010.01)

(52) U.S. Cl.
CPC ..... *H01M 10/052* (2013.01); *H01M 10/0525* (2013.01); *H01M 10/0585* (2013.01); *H01M 2220/30* (2013.01); *H01M 2300/0071* (2013.01); *H01M 2300/0094* (2013.01)

(58) Field of Classification Search
CPC ......... H01M 10/0585; H01M 2220/30; H01M 2300/0071; H01M 2300/0094
See application file for complete search history.

(56) References Cited

U.S. PATENT DOCUMENTS

| | | | |
|---|---|---|---|
| 2009/0068563 A1* | 3/2009 | Kanda | H01M 4/13 429/306 |
| 2012/0219842 A1 | 8/2012 | Visco et al. | |
| 2013/0216916 A1 | 8/2013 | Deschamps, Sr. | |
| 2013/0260257 A1 | 10/2013 | Choi | |
| 2014/0162113 A1* | 6/2014 | Ohta | H01B 1/08 429/162 |

FOREIGN PATENT DOCUMENTS

| | | | |
|---|---|---|---|
| JP | 2004-179158 A | | 6/2004 |
| JP | 2006-277997 A | | 10/2006 |
| JP | 4615339 B2 | | 1/2011 |
| JP | 2011113655 A | * | 6/2011 |
| JP | 6093449 B2 | | 12/2012 |
| JP | 2015013775 A | * | 1/2015 |

OTHER PUBLICATIONS

Mar. 1, 2017 Extended Search Report issued in European Patent Application No. 16169582.0.
Kim et al "Li—B—O—N electrolytes for all-solid-state thin film batteries," Journal of Power Sources, vol. 189, 2009, pp. 211-216.
Tong et al, "Highly Conductive Li Garnets by a Multielement Doping Strategy," Inorganic Chemistry, vol. 54, 2015, pp. 3600-3607.

* cited by examiner

SOLID ELECTROLYTE BATTERY, ELECTRODE ASSEMBLY, COMPOSITE SOLID ELECTROLYTE, AND METHOD FOR PRODUCING SOLID ELECTROLYTE BATTERY

This application claims a priority to Japanese Patent Application No. 2015-099783 filed on May 15, 2015 which is hereby expressly incorporated by reference in its entirety.

BACKGROUND

1. Technical Field

Several aspects of the present invention relate to a solid electrolyte battery, an electrode assembly, a composite solid electrolyte, and a method for producing a solid electrolyte battery.

2. Related Art

As a power supply for many electrical devices such as portable information devices, a lithium battery (including a primary battery and a secondary battery) has been used. The lithium battery includes a positive electrode, a negative electrode, and an electrolyte layer which is placed between the layers of these electrodes and mediates conduction of a lithium ion serving as a charge carrier.

Recently, as a lithium battery having both a high energy density and safety, an all-solid-state lithium battery using a solid electrolyte as a forming material of an electrolyte layer has been proposed (see, for example, JP-A-2006-277997, JP-A-2004-179158, and Japanese Patent No. 4615339).

For such an all-solid-state lithium battery, higher output power and higher capacity have been demanded, however, an all-solid-state lithium battery in the related art does not have sufficient such characteristics.

SUMMARY

An advantage of some aspects of the invention is to solve at least one of the problems described above, and the invention can be implemented as the following application examples and embodiments.

A solid electrolyte battery according to an application example of the invention includes a positive electrode which can occlude and release a first metal ion, a negative electrode which can occlude and release the first metal ion, a first solid electrolyte layer which is provided in contact with the positive electrode between the positive electrode and the negative electrode and contains at least a first metal which generates the first metal ion and oxygen as constituent elements, and a second solid electrolyte layer which is provided in contact with the negative electrode between the positive electrode and the negative electrode and contains at least the first metal, nitrogen, and oxygen as constituent elements.

According to this configuration, the first metal ion conductivity is increased at the interface between the first solid electrolyte layer and the positive electrode and at the interface between the second solid electrolyte layer and the negative electrode, and therefore, the internal resistance is decreased, and thus, a high-power solid electrolyte battery is obtained.

In the solid electrolyte battery according to the application example of the invention, it is preferred that the second solid electrolyte layer contains a metal oxide containing at least the first metal, and the metal oxide contains a nitrogen atom.

The covalent bonding property of the bond with nitrogen is stronger than that of the bond with oxygen, and therefore, by substituting oxygen with nitrogen, the electrostatic interaction between the backbone structure of the second solid electrolyte layer and the first metal ion is decreased, and therefore, the first metal ion conductivity is increased. As a result, the internal resistance is decreased, and thus, a high-power solid electrolyte battery is obtained.

In the solid electrolyte battery according to the application example of the invention, it is preferred that the second solid electrolyte layer includes a portion in which the content of nitrogen gradually increases from the surface on the first solid electrolyte layer side to the surface on the negative electrode side.

According to this configuration, in the second solid electrolyte layer, the composition continuously changes. As a result, there is no interface at which the composition is discontinuous between the first solid electrolyte layer and the second solid electrolyte layer, and therefore, the first metal ion conduction resistance is decreased, and thus, a solid electrolyte battery having a small internal resistance and excellent output power characteristics is obtained.

In the solid electrolyte battery according to the application example of the invention, it is preferred that in the second solid electrolyte layer, the content of nitrogen on the surface in contact with the negative electrode is 0.3 at % or more and 20 at % or less.

According to this configuration, while suppressing the decrease in the first metal ion conductivity in the inside of the second solid electrolyte layer, the first metal ion conduction resistance at the interface between the second solid electrolyte layer and the negative electrode can be decreased.

In the solid electrolyte battery according to the application example of the invention, it is preferred that the first solid electrolyte layer does not contain nitrogen as a constituent element.

According to this configuration, the nitriding of a metal oxide contained in the positive electrode can be minimized. As a result, the inhibition of the first metal ion conduction in the surface layer of the positive electrode caused by nitriding can be suppressed, and the increase in the first metal ion conduction resistance at the interface between the first solid electrolyte layer and the positive electrode can be suppressed.

In the solid electrolyte battery according to the application example of the invention, it is preferred that the positive electrode includes a positive electrode active material layer which is in contact with the first solid electrolyte layer and contains an oxide containing at least the first metal and a positive electrode current collector which is provided on the opposite side to the first solid electrolyte layer of the positive electrode active material layer, and the negative electrode includes a negative electrode active material layer which is in contact with the second solid electrolyte layer and contains at least the first metal and a negative electrode current collector which is provided on the opposite side to the second solid electrolyte layer of the negative electrode active material layer.

According to this configuration, a solid electrolyte battery having a particularly small internal resistance and excellent output power characteristics is obtained.

In the solid electrolyte battery according to the application example of the invention, it is preferred that the first metal is constituted by at least one or more metal elements selected from the group consisting of alkali metal elements and Group 2 elements.

An alkali metal has one outermost electron and easily releases the electron, and therefore is particularly useful as the first metal capable of forming the first metal ion serving as a charge carrier. Further, a Group 2 element has two outermost electrons and easily releases the electrons, and also can transport a plurality of electrons by one charge carrier, and therefore can increase the capacity of the solid electrolyte battery.

In the solid electrolyte battery according to the application example of the invention, it is preferred that the first metal is lithium.

According to this configuration, a lithium secondary battery is obtained.

In the solid electrolyte battery according to the application example of the invention, it is preferred that each of the first solid electrolyte layer and the second solid electrolyte layer further contains boron.

According to this configuration, each of the first solid electrolyte layer and the second solid electrolyte layer is less likely to be affected by moisture, and therefore, the long-term stability of the function can be increased regardless of the environment.

In the solid electrolyte battery according to the application example of the invention, it is preferred that the positive electrode includes a positive electrode active material layer which is in contact with the first solid electrolyte layer and contains an oxide containing at least the first metal, the positive electrode active material layer includes active material particles in the form of particles containing a lithium multiple oxide and communication holes provided between the active material particles, and in each communication hole, a third solid electrolyte layer containing a solid electrolyte represented by $Li_{7-x}La_3 (Zr_{2-x}, M_x) O_{12}$ (wherein M represents at least one element selected from Nb, Sc, Ti, V, Y, Hf, Ta, Al, Si, Ga, Ge, Sn, and Sb, and X represents a real number of 0 or more and 2 or less) is provided in contact with the first solid electrolyte layer and the active material particles.

According to this configuration, the first metal ion conductivity of the third solid electrolyte layer can be further increased, and also the mechanical strength of the third solid electrolyte layer can be further increased.

In the solid electrolyte battery according to the application example of the invention, it is preferred that the positive electrode includes a positive electrode active material layer which is in contact with the first solid electrolyte layer and contains an oxide containing at least the first metal, the positive electrode active material layer includes active material particles in the form of particles containing a lithium multiple oxide and communication holes provided between the active material particles, and in each communication hole, a fourth solid electrolyte layer containing a solid electrolyte represented by $Li_{2+X}C_{1-X}B_XO_3$ (wherein X represents a real number more than 0 and 1 or less) is provided in contact with the first solid electrolyte layer and the active material particles.

According to this configuration, a solid electrolyte battery having a particularly high output power and high capacity is obtained.

An electrode assembly according to an application example of the invention includes a positive electrode which can occlude and release a first metal ion, a first solid electrolyte layer which is provided in contact with the positive electrode and contains at least a first metal which generates the first metal ion and oxygen as constituent elements and does not contain nitrogen, and a second solid electrolyte layer which is provided in contact with the first solid electrolyte layer on the opposite side to the positive electrode of the first solid electrolyte layer and contains at least the first metal, nitrogen, and oxygen as constituent elements.

According to this configuration, an electrode assembly capable of realizing a high-power solid electrolyte battery is obtained.

A composite solid electrolyte according to an application example of the invention includes a first solid electrolyte layer which is used in contact with a positive electrode which can occlude and release a first metal ion and contains at least a first metal which generates the first metal ion and oxygen as constituent elements and does not contain nitrogen, and a second solid electrolyte layer which is used in contact with a negative electrode which can occlude and release the first metal ion, is in contact with the first solid electrolyte layer, and contains at least the first metal, nitrogen, and oxygen as constituent elements.

According to this configuration, a composite solid electrolyte capable of realizing a high-power solid electrolyte battery is obtained.

A method for producing a solid electrolyte battery according to an application example of the invention includes forming a first solid electrolyte layer which contains at least a first metal which generates a first metal ion and oxygen as constituent elements and does not contain nitrogen by a gas phase deposition method with respect to a positive electrode which can occlude and release the first metal ion, forming a second solid electrolyte layer which contains at least the first metal, nitrogen, and oxygen as constituent elements by a gas phase deposition method with respect to the first solid electrolyte layer, and disposing a negative electrode with respect to the second solid electrolyte layer.

According to this configuration, a high-power solid electrolyte battery can be efficiently produced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
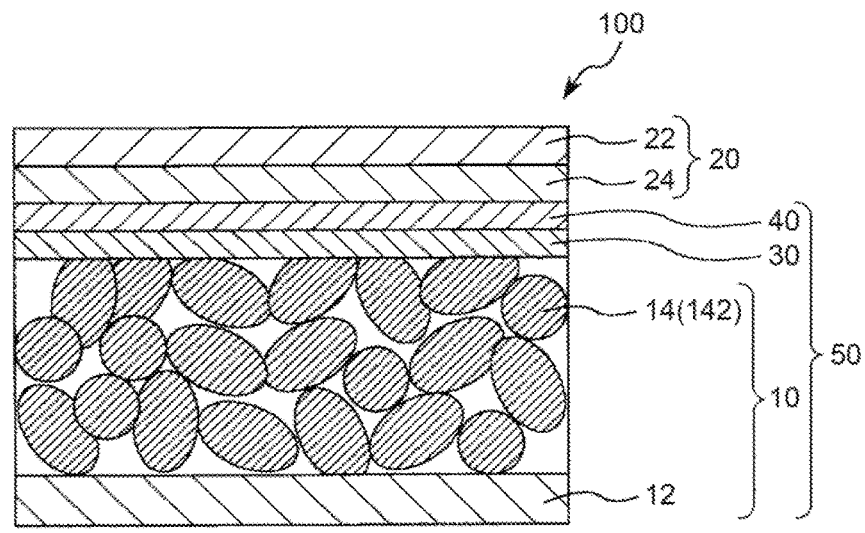
FIG. 1 is a longitudinal cross-sectional view showing a lithium secondary battery to which a first embodiment of a solid electrolyte battery according to the invention is applied.

Hereinafter, embodiments of the solid electrolyte battery, the electrode assembly, the composite solid electrolyte, and the method for producing a solid electrolyte battery according to the invention will be described with reference to the accompanying drawings. In the drawings to be used for the description, in order to make the drawings easy to see, the dimension, ratio, etc. of each constituent member are made appropriately different from those of the actual one. Further, for the sake of convenience of description, the upper side in the drawings is referred to as "upper" and the lower side therein is referred to as "lower".

In the following description, as examples of the solid electrolyte battery, secondary batteries in which a first metal ion serving as a charge carrier is a lithium ion or a sodium ion, that is, a lithium secondary battery (lithium-ion secondary battery) and a sodium secondary battery (sodium-ion secondary battery) are particularly described, however, the solid electrolyte battery according to the invention is not limited to these examples, and for example, a potassium-ion secondary battery, a calcium-ion secondary battery, a magnesium-ion secondary battery, an aluminum-ion secondary battery, a silver-ion battery, a metal-air battery represented by a lithium-air battery, and the like may be adopted.

Lithium Secondary Battery

First, lithium secondary batteries to which each embodiment of the solid electrolyte battery according to the invention is applied, and each embodiment of the electrode assembly according to the invention and each embodiment of the composite solid electrolyte according to the invention to be included therein will be described.

First Embodiment

FIG. 1 is a longitudinal cross-sectional view showing a lithium secondary battery to which a first embodiment of the solid electrolyte battery according to the invention is applied.

A lithium secondary battery 100 includes a positive electrode 10, a negative electrode 20, a first solid electrolyte layer 30 and a second solid electrolyte layer 40 provided between the positive electrode 10 and the negative electrode 20. This lithium secondary battery 100 is a so-called all-solid-state lithium (ion) secondary battery.

The positive electrode 10 is a portion which can occlude and release a lithium ion which is a first metal ion, and includes a positive electrode current collector 12 and a positive electrode active material layer 14 as shown in FIG. 1. Hereinafter, a structure in which the positive electrode 10, the first solid electrolyte layer 30, and the second solid electrolyte layer 40 are combined is referred to as "electrode assembly 50". Further, hereinafter, a structure in which the first solid electrolyte layer 30 and the second solid electrolyte layer 40 are combined is referred to as "composite solid electrolyte".

The positive electrode current collector 12 is an electrical conductor for drawing an electric current generated by a redox reaction and is provided in contact with the positive electrode active material layer 14.

As the forming material (constituent material) of the positive electrode current collector 12, for example, one type of metal (a metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy containing two or more types of metal elements selected from this group, or the like can be used.

The shape of the positive electrode current collector 12 is not particularly limited, and examples thereof include a plate, a foil, and a net. The surface of the positive electrode current collector 12 may be smooth or may have irregularities formed thereon.

The positive electrode active material layer 14 includes active material particles 142 in the form of particles containing an active material and is a porous molded body (active material molded body) formed by three-dimensionally connecting a plurality of active material particles 142 to one another.

A plurality of pores included in the positive electrode active material layer 14 form communication holes which communicate with one another in a net shape in the inside of the positive electrode active material layer 14. That is, the positive electrode active material layer 14 is constituted by a porous body including gaps composed of the communication holes. By allowing the first solid electrolyte layer 30 to penetrate into the gaps of this porous body in the vicinity of the upper surface of the positive electrode active material layer 14, the active material particle 142 and the first solid electrolyte layer 30 come in contact with each other more frequently, and thus, a sufficiently large contact area can be ensured between the positive electrode active material layer 14 and the first solid electrolyte layer 30.

The positive electrode active material layer 14 contains an inorganic positive electrode active material containing lithium oxide as a forming material.

As such a positive electrode active material, for example, a lithium multiple oxide is preferably used. The "lithium multiple oxide" as used herein refers to an oxide which always contains lithium, and also contains two or more types of metal ions as a whole, but is free of oxoacid ions. By containing such a lithium multiple oxide, the transfer of electrons between the active material particles 142 is facilitated, and also the transfer of a lithium ion serving as a charge carrier between the active material particle 142 and the first solid electrolyte layer 30 is facilitated, and therefore, the function as the positive electrode active material layer 14 is particularly favorably exhibited.

Specific examples of the lithium multiple oxide include $LiCoO_2$, $LiNiO_2$, $LiMn_2O_4$, $Li_2MnO_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$. Further, in this specification, solid solutions obtained by substituting part of the atoms in a crystal of any of these lithium multiple oxides with another transition metal, a typical metal, an alkali metal, an alkaline earth element, a lanthanoid, a chalcogenide, a halogen, or the like are also included in the lithium multiple oxide, and any of these solid solutions can also be used as the positive electrode active material.

Among these, $LiCoO_2$ is preferably used as the lithium multiple oxide. This active material has high electron conductivity, and therefore is useful as the forming material to be used for the positive electrode active material layer 14. Incidentally, $LiCoO_2$ is known to have anisotropy in the electron conductivity. Due to this, when the positive electrode active material layer 14 is tried to be formed using $LiCoO_2$ as the forming material, the electron conductivity in the intended direction from the viewpoint of charging and discharging the lithium secondary battery 100 (the direction connecting the positive electrode 10 and the negative electrode 20) may be decreased depending on the formation method.

Therefore, when the active material particles 142 are three-dimensionally connected to one another as the positive electrode active material layer 14 according to this embodiment, the anisotropy in the electron conductivity can be reduced. Due to this, even in the case where a material has anisotropy in the electron conductivity as in the case of $LiCoO_2$, the adverse effect of the anisotropy of the material can be minimized.

The average particle diameter of the active material particles 142 is preferably 300 nm or more and 50 µm or less, more preferably 450 nm or more and 10 µm or less, further more preferably 500 nm or more and 5 µM or less. When an active material having such an average particle diameter is used, the porosity of the positive electrode active material layer 14 to be obtained can be set within the below-mentioned range. According to this, the surface area in the pore of the positive electrode active material layer 14 can be increased, and also the contact area between the positive electrode active material layer 14 and the first solid electrolyte layer 30 can be easily increased, and thus, the capacity of the lithium secondary battery 100 can be increased.

When the average particle diameter of the active material particles 142 is less than the above lower limit, the radius of the pore of the positive electrode active material layer 14 to be formed tends to be small such that the radius of the pore is several tens of nanometers depending on the type of the forming material of the first solid electrolyte layer 30, and therefore, it becomes difficult for the first solid electrolyte layer 30 to penetrate into the pore. As a result, the contact area between the positive electrode active material layer 14 and the first solid electrolyte layer 30 may not be able to be sufficiently increased.

When the average particle diameter of the active material particles 142 exceeds the above upper limit, the specific surface area which is the surface area per unit mass of the positive electrode active material layer 14 to be formed is decreased, and thus, the contact area between the positive electrode active material layer 14 and the first solid electrolyte layer 30 may be decreased. Therefore, a sufficient output power may not be able to be obtained in the lithium secondary battery 100. Further, the ion diffusion distance from the inside of the active material particle 142 to the first solid electrolyte layer 30 is increased, and therefore, it may be difficult for the lithium multiple oxide around the center of the active material particle 142 to contribute to the function of a battery.

The average particle diameter of the active material particles 142 can be determined by dispersing the active material particles 142 in n-octanol at a concentration in the range of 0.1 mass % or more and 10 mass % or less, and then, measuring the median diameter using a light scattering particle size distribution analyzer (Nanotrac UPA-EX250, manufactured by Nikkiso Co., Ltd.).

The porosity of the positive electrode active material layer 14 is preferably 10% or more and 50% or less, more preferably 30% or more and 50% or less. When the positive electrode active material layer 14 has such a porosity, the surface area of the inside of the pore of the positive electrode active material layer 14 is increased, and also the contact area between the positive electrode active material layer 14 and the first solid electrolyte layer 30 is easily increased. As a result, the capacity of the lithium secondary battery 100 can be increased.

The porosity can be determined, for example, according to the following formula (I) from (1) the volume (apparent volume) of the positive electrode active material layer 14 including the pores obtained from the external dimension of the positive electrode active material layer 14, (2) the mass of the positive electrode active material layer 14 (active material molded body), and (3) the density of the active material constituting the positive electrode active material layer 14.

$$\text{Porosity (\%)} = [1-(\text{mass of active material molded body})/(\text{apparent volume}) \times (\text{density of active material})] \times 100 \quad (I)$$

Further, as will be described in detail later, the porosity of the positive electrode active material layer 14 can be controlled by using a pore-forming material constituted by an organic material in the form of particles in the step of forming the positive electrode active material layer 14.

The positive electrode active material layer 14 may contain an organic material such as a binder for binding the active material particles to each other or a conductive additive for ensuring the electrical conductivity of the positive electrode active material layer 14, however, in this embodiment, the positive electrode active material layer 14 is formed without using a binder, a conductive additive, or the like when forming the positive electrode active material layer 14, and is constituted by almost only an inorganic material. Specifically, in the positive electrode active material layer 14 according to this embodiment, for example, a mass loss percentage when the positive electrode active material layer 14 is heated to 400° C. for 30 minutes is 5 mass % or less. The mass loss percentage is preferably 3 mass % or less, more preferably 1 mass % or less, and particularly preferably, the mass loss is not observed or is within the limits of error. When the mass loss percentage of the positive electrode active material layer 14 is within such a range, in the positive electrode active material layer 14, a material which is evaporated under a predetermined heating condition such as a solvent or adsorbed water, or an organic material which is vaporized by burning or oxidation under a predetermined heating condition is contained in an amount of only 5 mass % or less with respect to the total mass of the structure. Accordingly, the lithium secondary battery 100 having high long-term reliability can be obtained.

In addition, because the addition amount of the binder or the conductive additive is small, the capacity per unit volume of the positive electrode active material layer 14 can also be increased.

The mass loss percentage of the positive electrode active material layer 14 can be determined as follows. By using a thermogravimetric/differential thermal analyzer (TG-DTA), the positive electrode active material layer 14 is heated under a predetermined heating condition, and the mass of the positive electrode active material layer 14 after heating under the predetermined heating condition is measured, and the mass loss percentage is calculated from the ratio between the mass before heating and the mass after heating.

The thickness of the positive electrode 10 is not particularly limited, but is, for example, preferably 5 µm or more and 500 µm or less, more preferably 30 µm or more and 300 µm or less.

The first solid electrolyte layer 30 contains a first inorganic solid electrolyte as a forming material and is provided in contact with the upper surface of the positive electrode active material layer 14.

The first inorganic solid electrolyte contains lithium and oxygen as constituent elements. Such a first solid electrolyte layer 30 can form an interface with a small interface resistance to the positive electrode active material layer 14 (positive electrode 10) containing lithium and oxygen as constituent elements similarly. That is, the first solid electrolyte layer 30 containing lithium oxide can decrease the lithium ion conduction resistance at the interface to the positive electrode active material layer 14 containing lithium oxide similarly. According to this, the lithium secondary battery 100 having a small internal resistance and excellent output power characteristics is obtained.

The content of nitrogen as a constituent element in the first inorganic solid electrolyte is preferably smaller than the content of nitrogen in the below-mentioned second inorganic solid electrolyte. Such a first solid electrolyte layer 30 suppresses the increase in the lithium ion conduction resistance between the first solid electrolyte layer 30 and the positive electrode active material layer 14. That is, in the case where nitrogen is contained in the first inorganic solid electrolyte layer 30 at a relatively high concentration, when the first solid electrolyte layer 30 is formed, the active material contained in the positive electrode active material layer 14 is nitrided, and therefore, the lithium ion conduction resistance between the first solid electrolyte layer 30 and the positive electrode active material layer 14 may be increased. Accordingly, by decreasing the content of nitrogen in the first solid electrolyte layer 30, such a problem can be solved.

In the first solid electrolyte layer 30, the content of nitrogen on the surface thereof in contact with the positive electrode active material layer 14 is preferably 0.2 at % or less, more preferably 0.1 at % or less, further more preferably 0.05 at % or less. In other words, it is preferred that the first solid electrolyte layer 30 does not contain nitrogen other than nitrogen which is inevitably contained as an impurity. By suppressing the content of nitrogen within the above range, the nitriding of the active material contained in the positive electrode active material layer 14 can be minimized. As a result, the inhibition of the lithium ion conduction in the surface layer of the positive electrode caused by nitriding can be suppressed, and the increase in the lithium ion conduction resistance at the interface between the first solid electrolyte layer 30 and the positive electrode active material layer 14 can be suppressed.

The content of nitrogen can be measured by, for example, X-ray photoelectron spectroscopy, Auger electron spectroscopy, energy dispersive X-ray analysis, or the like.

The first inorganic solid electrolyte is not particularly limited as long as it is lithium oxide containing lithium and oxygen as constituent elements, however, in particular, lithium oxide containing at least one element selected from boron, carbon, silicon, germanium, phosphorus, and aluminum other than lithium and oxygen as constituent elements is preferably used. Such a material has excellent lithium ion conductivity in the inside and at the interface, and also has excellent long-term stability related to mechanical strength. Therefore, the lithium secondary battery 100 capable of maintaining a high output power over a long period of time can be realized.

As the first inorganic solid electrolyte, particularly, lithium oxide containing boron as a constituent element such as $Li_{2+X}C_{1-X}B_XO_3$ (wherein X represents a real number more than 0 and 1 or less), $Li_5BO_4$, $Li_4B_2O_5$, $Li_6B_4O_9$, $Li_2B_2O_4$ ($LiBO_2$), $Li_2B_4O_7$, or $Li_2B_2O_5$ is preferably used. Such an electrolyte is less likely to be affected by moisture, and therefore, the long-term stability of the function of the first solid electrolyte layer 30 can be increased regardless of the environment. As a result, such an electrolyte can particularly decrease the lithium ion conduction resistance at the interface between the first solid electrolyte layer 30 and the positive electrode active material layer 14.

The first inorganic solid electrolyte is not limited to one type of electrolyte, and may be constituted by a mixture of two or more types of electrolytes.

The first inorganic solid electrolyte may be a crystalline material, but is preferably an amorphous material. According to this, crystal grain boundaries contained in the first solid electrolyte layer 30 can be reduced. The crystal grain boundary is one of the causes of inhibition of lithium ion conduction, and therefore, by reducing the crystal grain boundaries, the lithium ion conductivity in the first solid electrolyte layer 30 can be increased, and thus, the output power of the lithium secondary battery 100 can be increased.

The average thickness of the first solid electrolyte layer 30 is not particularly limited, but is preferably 0.2 µm or more and 10 µm or less, more preferably 0.5 µm or more and 5 µm or less. By setting the thickness within such a range, even if the first solid electrolyte layer 30 penetrates into the pores contained in the positive electrode active material layer 14, the occurrence of a crack or the opening of a pore in the first solid electrolyte layer 30 can be suppressed. At the same time, the lithium ion conduction resistance of the first solid electrolyte layer 30 can be prevented from excessively increasing.

The second solid electrolyte layer 40 contains a second inorganic solid electrolyte as a forming material and is provided in contact with the lower surface of the negative electrode 20.

The second inorganic solid electrolyte contains lithium, nitrogen, and oxygen as constituent elements. Such a second solid electrolyte layer 40 can form an interface with a small interface resistance to the negative electrode active material layer 24 (negative electrode 20). That is, the second solid electrolyte layer 40 containing lithium oxynitride can decrease the lithium ion conduction resistance at the interface to the negative electrode active material layer 24. According to this, the lithium secondary battery 100 having a small internal resistance and excellent output power characteristics is obtained. This is because when lithium oxynitride is used as the second solid electrolyte layer 40, the negative electrode active material layer 24 is prevented from being oxidized, and therefore, the interface resistance can be decreased as compared with the case where lithium oxide containing no nitrogen is used as the inorganic solid electrolyte.

Further, by containing nitrogen, the lithium ion conductivity is increased, and therefore, also from this viewpoint, the lithium ion conductivity of the second solid electrolyte layer 40 of itself can be increased. In addition, such a second inorganic solid electrolyte is less likely to be reduced at the potential of the negative electrode 20, and therefore, the second solid electrolyte layer 40 or the first sol id electrolyte layer 30 can be prevented from being reduced. As a result, the lithium secondary battery 100 having a higher output power and high reliability is obtained.

Further, the content of nitrogen as a constituent element in the second inorganic solid electrolyte is preferably larger than the content of nitrogen in the first inorganic solid electrolyte. Such a second solid electrolyte layer 40 suppresses the increase in the lithium ion conduction resistance between the second solid electrolyte layer 40 and the negative electrode active material layer 24.

Further, the second solid electrolyte layer 40 preferably includes a portion in which the content of nitrogen gradually increases from the surface on the first solid electrolyte layer 30 side to the surface on the negative electrode active material layer 24 side. In such a second solid electrolyte layer 40, the content of nitrogen is high in the vicinity of the interface between the second solid electrolyte layer 40 and the negative electrode active material layer 24, and therefore, the effect as described above, that is, the effect of decreasing the lithium ion conduction resistance between the second solid electrolyte layer 40 and the negative electrode active material layer 24 can be obtained. On the other hand, in the vicinity of the interface between the second solid electrolyte layer 40 and the first solid electrolyte layer 30, the content of nitrogen is close to that in the first solid electrolyte layer 30, and therefore, the lithium ion conduction resistance between the second solid electrolyte layer 40 and the first solid electrolyte layer 30 can be suppressed to be small. In addition, in the second solid electrolyte layer 40, the composition continuously changes. As a result, there is no interface at which the composition is largely discontinuous between the first solid electrolyte layer 30 and the second solid electrolyte layer 40, and therefore, the lithium ion conduction resistance is decreased. As a result, the lithium secondary battery 100 having a small internal resistance and excellent output power characteristics is obtained.

The change in the content of nitrogen may be a continuous change or a stepwise change.

Further, whether or not the content of nitrogen gradually changes can be evaluated by, for example, performing Auger electron spectroscopy while subjecting the second solid electrolyte layer 40 to a sputtering treatment, and specifying the distribution of the content of nitrogen in the thickness direction of the second solid electrolyte layer 40.

Further, it is preferred that nitrogen contained in the second solid electrolyte layer 40 is present in a state where part of the oxygen atoms in the lithium oxide have been substituted with a nitrogen atom. The covalent bonding property of the bond with nitrogen is stronger than that of the bond with oxygen, and therefore, by substituting oxygen with nitrogen, the electrostatic interaction is decreased. In the second solid electrolyte layer 40 in which part of the oxygen atoms have been substituted with a nitrogen atom, the electrostatic interaction between the backbone structure of the second solid electrolyte layer 40 and the lithium ion is decreased, and therefore, the lithium ion conductivity is increased. As a result, the internal resistance is decreased, and thus, a high-power solid electrolyte battery is obtained.

In the second solid electrolyte layer 40, the content of nitrogen on the surface thereof in contact with the negative electrode active material layer 24 is preferably 0.3 at % or more and 20 at % or less, more preferably 0.5 at % or more and 10 at % or less, further more preferably 1 at % or more and 5 at % or less. By setting the content of nitrogen within the above range, the above-mentioned effect is more reliably exhibited. That is, when the content of nitrogen is lower than the above lower limit, the effect of addition of nitrogen may be weakened, and on the other hand when the content of nitrogen exceeds the above upper limit, it becomes difficult to form the second solid electrolyte layer 40.

The content of nitrogen can be measured by, for example, X-ray photoelectron spectroscopy, Auger electron spectroscopy, energy dispersive X-ray analysis, or the like.

The second inorganic solid electrolyte is not particularly limited as long as it is lithium oxide containing lithium, nitrogen, and oxygen as constituent elements, however, in particular, lithium oxide containing at least one element selected from boron, carbon, silicon, germanium, phosphorus, and aluminum other than lithium, nitrogen, and oxygen as constituent elements is preferably used. Such a material can particularly stably hold a nitrogen atom, and therefore, the second solid electrolyte layer 40 having particularly high lithium ion conductivity in the inside and at the interface can be realized. As a result, the lithium secondary battery 100 capable of maintaining a high output power over a long period of time can be realized.

As the second inorganic solid electrolyte, particularly, lithium oxide containing nitrogen and boron as constituent elements such as $Li_{2+X+Y}C_{1-X}B_XO_{3-Z}N_Z$ (wherein X represents a real number more than 0 and 1 or less, and Y and Z each represent a real number) is preferably used. Such an electrolyte is less likely to be affected by moisture, and therefore, the long-term stability of the function of the second solid electrolyte layer 40 can be increased regardless of the environment. As a result, such an electrolyte can particularly decrease the lithium ion conduction resistance at the interface between the second solid electrolyte layer 40 and the negative electrode active material layer 24.

The atomic ratio of Li, C, and B in the second inorganic solid electrolyte is not limited to that described above and may be appropriately changed.

The second inorganic solid electrolyte is not limited to one type of electrolyte, and may be constituted by a mixture of two or more types of electrolytes.

The second inorganic solid electrolyte may be a crystalline material, but is preferably an amorphous material. According to this, crystal grain boundaries contained in the second solid electrolyte layer 40 can be reduced. The crystal grain boundary is one of the causes of inhibition of lithium ion conduction, and therefore, by reducing the crystal grain boundaries, the lithium ion conductivity in the second solid electrolyte layer 40 can be increased, and thus, the output power of the lithium secondary battery 100 can be increased.

The average thickness of the second solid electrolyte layer 40 is not particularly limited, but is preferably 0.2 µm or more and 10 µm or less, more preferably 0.5 µm or more and 5 µm or less. By setting the thickness within such a range, even if the first solid electrolyte layer 30 penetrates into the pores contained in the positive electrode active material layer 14 and the second solid electrolyte layer 40 is deformed accompanying this, the occurrence of a crack or the opening of a pore in the second solid electrolyte layer 40 can be suppressed. At the same time, the lithium ion conduction resistance of the second solid electrolyte layer 40 can be prevented from excessively increasing.

Further, at the interface between the positive electrode active material layer 14 and the first solid electrolyte layer 30 according to this embodiment, the first solid electrolyte layer 30 may penetrate into the pores of the positive electrode active material layer 14. According to this, the contact area between the positive electrode active material layer 14 and the first solid electrolyte layer 30 is increased, and the lithium ion conduction resistance at the interface can be decreased. As a result, the lithium ion conductivity at the interface between the positive electrode active material layer 14 and the first solid electrolyte layer 30 is further increased, and thus, the output power of the lithium secondary battery 100 can be increased.

The above-mentioned positive electrode active material layer 14 is configured such that the lower surface thereof is in contact with the positive electrode current collector 12, and the upper surface thereof is in contact with the first solid electrolyte layer 30. Therefore, the first solid electrolyte layer 30 and the second solid electrolyte layer 40 each function as an insulating layer which prevents the positive electrode active material layer 14 from coming in direct contact with the negative electrode active material layer 24, that is, prevents the occurrence of a short circuit between the positive electrode 10 and the negative electrode 20.

In this manner, the composite solid electrolyte including the first solid electrolyte layer 30 and the second solid electrolyte layer 40, and the electrode assembly 50 including the composite solid electrolyte are each preferably used in the production of the lithium secondary battery 100 having a small internal resistance and excellent output power characteristics.

The negative electrode 20 is a portion which can occlude and release a lithium ion which is the first metal ion, and includes a negative electrode current collector 22 and a negative electrode active material layer 24 as shown in FIG. 1.

The negative electrode current collector 22 is an electrical conductor for drawing electrons generated by a redox reaction and is provided in contact with the negative electrode active material layer 24.

Examples of the forming material (constituent material) of the negative electrode current collector 22 include the same metals as those exemplified as the forming material of the positive electrode current collector 12 described above.

Further, also the shape of the negative electrode current collector 22 is appropriately selected from the shapes exemplified as the shape of the positive electrode current collector 12.

The negative electrode active material layer 24 contains a negative electrode active material as a forming material (constituent material).

Examples of the negative electrode active material include lithium metal, metals capable of forming an alloy with lithium (for example, aluminum, silicon, tin, bismuth, indium, and the like), alloys of such a metal with lithium, lithium multiple oxides such as $Li_4Ti_5O_{12}$ and $Li_2Ti_3O_7$, and known negative electrode active materials.

The shape of the negative electrode active material layer 24 is not particularly limited, and may be a dense layer or a porous layer.

The thickness of the negative electrode 20 is not particularly limited, but is, for example, preferably 1 μm or more and 100 μm or less, more preferably 5 μm or more and 50 μm or less.

Second Embodiment

Next, a lithium secondary battery to which a second embodiment of the solid electrolyte battery according to the invention is applied, and a second embodiment of the electrode assembly according to the invention to be included therein will be described.

Figure 2:
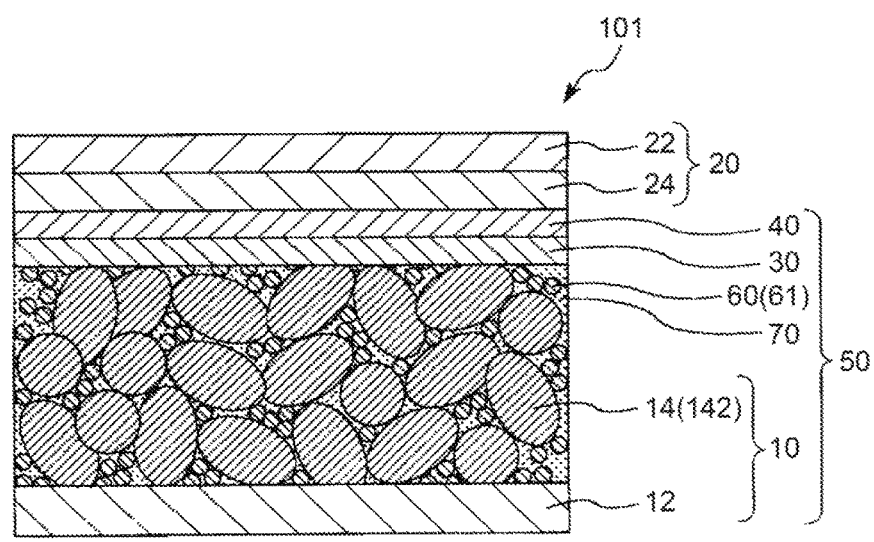
FIG. 2 is a longitudinal cross-sectional view showing a lithium secondary battery to which a second embodiment of the solid electrolyte battery according to the invention is applied.

FIG. 2 is a longitudinal cross-sectional view showing a lithium secondary battery to which a second embodiment of the solid electrolyte battery according to the invention is applied.

Hereinafter, a lithium secondary battery 101 according to the second embodiment will be described, however, in the following description, different points from the lithium secondary battery 100 according to the first embodiment will be mainly described, and the description of the same matter will be omitted.

The lithium secondary battery 101 shown in FIG. 2 is the same as the lithium secondary battery 100 shown in FIG. 1 except that the lithium secondary battery 101 further includes a third solid electrolyte layer 60 and a fourth solid electrolyte layer 70.

A positive electrode active material layer 14 shown in FIG. 2 includes active material particles 142 and has a plurality of gaps (communication holes) therein. By allowing the third solid electrolyte layer 60 including particulate bodies 61 to penetrate into the gaps, the active material particles 142 and the particulate bodies 61 of the third solid electrolyte layer 60 come in contact with each other more frequently, and thus, a sufficiently large contact area can be ensured between the positive electrode active material layer 14 and the third solid electrolyte layer 60. Further, the fourth solid electrolyte layer 70 is provided so as to further fill the gaps which are not completely filled with the third solid electrolyte layer 60. That is, an electrode assembly 50 according to this embodiment includes a positive electrode 10, a first solid electrolyte layer 30, a second solid electrolyte layer 40, the third solid electrolyte layer 60, and the fourth solid electrolyte layer 70. According to this, the gap between the active material particle 142 and the particulate body 61 is filled with the fourth solid electrolyte layer 70 so as to contribute to the increase in the lithium ion conductivity therebetween. As a result, the lithium secondary battery 101 having a small internal resistance and excellent output power characteristics is obtained. Further, by filling at least part of the gaps of the positive electrode active material layer 14 with the third solid electrolyte layer 60 and the fourth solid electrolyte layer 70, the capacity of the lithium secondary battery 101 can be increased.

The third solid electrolyte layer 60 contains a third inorganic solid electrolyte as a forming material (constituent material) and is provided in contact with the surface of the active material particle 142 in the pore (gap) contained in the positive electrode active material layer 14.

The third inorganic solid electrolyte is not particularly limited as long as it is a solid electrolyte capable of conducting a lithium ion, however, lithium oxide which is a crystalline material and contains La and Zr as constituent elements is preferably used.

As the third inorganic solid electrolyte, specifically, lithium oxide represented by the following formula (II) is preferably used.

$$Li_{7-x}La_3(Zr_{2-x},M_x)O_{12} \tag{II}$$

In the formula (II), M represents at least one element selected from Nb, Sc, Ti, V, Y, Hf, Ta, Al, Si, Ga, Ge, Sn, and Sb, and X represents a real number of 0 or more and 2 or less.

M in the above formula is particularly preferably at least one element selected from Nb (niobium) and Ta (tantalum). According to this, the lithium ion conductivity of the third inorganic solid electrolyte to be obtained can be further increased, and also the mechanical strength of the third inorganic solid electrolyte can be further increased.

X in the above formula, that is, the substitution ratio of the metal M is preferably 0.1 or more and 1 or less, more preferably 0.2 or more and 0.6 or less. When the X is too small, depending on the type or the like of the metal M, the above-mentioned function of the third inorganic solid electrolyte may not be able to be sufficiently exhibited.

Further, the lithium oxide represented by the above formula may have any crystal structure of a cubic crystal structure and a tetragonal crystal structure, but preferably has a cubic garnet crystal structure. According to this, the lithium ion conductivity of the third inorganic solid electrolyte can be further improved.

More specifically, $Li_{6.7}La_3Zr_{1.7}Nb_{0.3}O_{12}$ is particularly preferably used.

Such a third inorganic solid electrolyte is less likely to cause an undesired reaction with the below-mentioned fourth inorganic solid electrolyte containing boron as a constituent element when it coexists with the fourth inorganic solid electrolyte. Due to this, by using the third inorganic solid electrolyte as described above, the lithium ion conductivity between the positive electrode active material layer 14 and the third solid electrolyte layer 60 or between the fourth solid electrolyte layer 70 and the third solid electrolyte layer 60 can be further increased.

The third inorganic solid electrolyte which is the constituent material of the third solid electrolyte layer 60 is produced by firing (heating) a precursor of the third inorganic solid electrolyte as described in the below-mentioned method for producing a lithium secondary battery. The third inorganic solid electrolyte produced during this firing includes particulate bodies 61 composed of secondary particles formed by granulating primary particles thereof. Due to this, the third solid electrolyte layer 60 is provided in contact with the surface of the active material particles 142 including the inside of the gaps of the positive electrode active material layer 14, but is constituted by an assembly of the particulate bodies 61, and therefore, also the third solid electrolyte layer 60 becomes a porous body in the same manner as the active material particles 142.

The ion conductivity of the third solid electrolyte layer 60 is preferably $1 \times 10^{-5}$ S/cm or more, more preferably $1 \times 10^{-4}$ S/cm or more. When the third solid electrolyte layer 60 has such an ion conductivity, a lithium ion also reaches the surface of the positive electrode active material layer 14 at a position away from the surface of the positive electrode 10 and can contribute to a redox reaction. Due to this, the utilization of the positive electrode active material layer 14 in the positive electrode 10 is improved, and thus the capacity can be increased. At this time, when the ion conductivity is less than the above lower limit, only the positive electrode active material layer 14 in the vicinity of the surface layer of the surface facing a counter electrode contributes to the redox reaction in the positive electrode 10, and therefore, the capacity may be decreased.

The "ion conductivity of the third solid electrolyte layer 60" as used herein refers to the "total ion conductivity", which is the sum of the "bulk conductivity", which is the conductivity of the above-mentioned inorganic solid electrolyte itself constituting the third solid electrolyte layer 60, and the "grain boundary ion conductivity", which is the conductivity between crystal grains when the inorganic solid electrolyte is a crystalline material.

The ion conductivity of the third solid electrolyte layer 60 is determined, for example, as follows. A tablet-shaped body obtained by press-molding a solid electrolyte powder at 624 MPa is sintered at 800° C. for 8 hours in an air atmosphere, and then, a gold electrode or the like is formed on both surfaces of the sintered body by sputtering or the like, thereby forming a test subject, and thereafter, measurement is performed by an AC impedance method. As the measurement device, for example, an impedance analyzer (model SI1260, manufactured by Solartron Co., Ltd.) is used.

The third inorganic solid electrolyte is not limited to a crystalline material, and may be an amorphous material.

The fourth solid electrolyte layer 70 contains a fourth inorganic solid electrolyte as a forming material (constituent material) and is provided in contact with the surface of the active material particle 142 in the pore (gap) contained in the positive electrode active material layer 14 in the same manner as the third solid electrolyte layer 60.

The fourth inorganic solid electrolyte is not particularly limited as long as it is a solid electrolyte capable of conducting a lithium ion, however, lithium oxide containing at least one element selected from boron, carbon, silicon, germanium, phosphorus, and aluminum as a constituent element is preferably used, and lithium oxide containing boron as a constituent element is more preferably used.

In particular, the latter lithium oxide is less likely to be affected by moisture, and therefore, the long-term stability of the fourth solid electrolyte layer 70 can be further increased. That is, when moisture infiltrates, a defect occurs in the conduction path of a lithium ion in the solid electrolyte, and therefore, the conductivity is decreased, however, by forming the fourth solid electrolyte layer 70, the formation of such a defect can be suppressed. As a result, the charge-discharge cycles are stabilized, and thus, the lithium secondary battery 101 having higher reliability is obtained.

As the fourth inorganic solid electrolyte, specifically, lithium oxide represented by $Li_{2+X}C_{1-X}B_XO_3$ (wherein X represents a real number more than 0 and 1 or less) is preferably used, and the lithium oxide wherein X is a real number in the range more than 0 and 0.4 or less is preferably used, and $Li_{2.2}C_{0.8}B_{0.2}O_3$ is more preferably used. In the case where such a fourth inorganic solid electrolyte is particularly a crystalline material, the fourth inorganic solid electrolyte has a relatively high lithium ion conductivity. Therefore, by using such a fourth inorganic solid electrolyte, the lithium ion conductivity in the positive electrode 10 is enhanced, and thus, not only high reliability is obtained over a long period of time, but also the lithium secondary battery 101 whose output power and capacity are increased is obtained.

The fourth inorganic solid electrolyte may be an amorphous material, but is preferably a crystalline material. In the fourth solid electrolyte layer 70 containing such a fourth inorganic solid electrolyte, when the fourth inorganic solid electrolyte is a crystalline material, the lithium ion conductivity characteristic of the material is sufficiently exhibited. Due to this, the decrease in the lithium ion conductivity caused by a defect in the third solid electrolyte layer 60 in the gaps of the positive electrode active material layer 14 can be sufficiently compensated by the fourth solid electrolyte layer 70. According to this, the capacity and output power of the lithium secondary battery 101 can be increased.

From the above viewpoint, as the fourth inorganic solid electrolyte, a material having a composition capable of crystallization when the material is melted and solidified is appropriately selected.

The "crystalline material" as used herein includes both a single crystal and a polycrystal.

It is possible to determine whether the fourth inorganic solid electrolyte is a crystalline material or not by, for example, whether a peak derived from a crystal is observed or not in a crystal structure analysis using X-ray diffraction (XRD).

The average grain size of the crystals contained in the fourth solid electrolyte layer 70 to be formed varies also depending on the size of the pore of the positive electrode active material layer 14, and therefore is not particularly limited, but is preferably 0.1 μm or more and 50 μm or less, more preferably 1 μm or more and 10 μm or less. By setting the average grain size of the crystals within the above range, the fourth solid electrolyte layer 70 exhibits characteristics close to the lithium ion conductivity characteristic of the material of the fourth inorganic solid electrolyte. Due to this, by filling the inside of the gaps of the positive electrode active material layer 14 with the fourth solid electrolyte layer 70, the capacity and output power of the lithium secondary battery 101 can be more reliably increased.

The average grain size of the crystals is obtained by, for example, observing the cross section of the fourth solid electrolyte layer 70 using an electron microscope or the like, and determining the two-axis average diameter in the cross section of the crystal of the fourth inorganic solid electrolyte as the grain size, and also averaging the grain sizes of 10 or more crystals.

The existing amount of such a third solid electrolyte layer 60 and a fourth solid electrolyte layer 70 is determined according to the volume or the like of the pores of the positive electrode active material layer 14. For example, the total existing amount of the third solid electrolyte layer 60 and the fourth solid electrolyte layer 70 is preferably 50 vol % or more, more preferably 70 vol. % or more of the volume of the pores of the positive electrode active material layer 14. According to this, the above-mentioned effect is more reliably exhibited.

Further, the existing amount of the fourth solid electrolyte layer 70 alone is, although not particularly limited, preferably 20 vol % or more and 500 vol % or less, more preferably 30 vol % or more and 300 vol % or less of the volume of the third solid electrolyte layer 60. When the ratio between the volume of the third solid electrolyte layer 60 and the volume of the fourth solid electrolyte layer 70 is within the above range, the balance between the effect brought about by the third solid electrolyte layer 60 and the effect brought about by the fourth solid electrolyte layer 70 is optimized. As a result, while further stabilizing the charge-discharge cycles, the capacity and output power of the lithium secondary battery 101 can be further increased.

The fourth inorganic solid electrolyte is not limited to the above-mentioned material, and may be, for example, a mixture of two or more types of inorganic solid electrolytes.

Also such a lithium secondary battery 101 according to the second embodiment can bring about the same effect as in the above-mentioned first embodiment.

Incidentally, either of the third solid electrolyte layer 60 and the fourth solid electrolyte layer 70 may be omitted.

Third Embodiment

Next, a lithium secondary battery to which a third embodiment of the solid electrolyte battery according to the invention is applied, and a third embodiment of the electrode assembly according to the invention to be included therein will be described.

Figure 3:
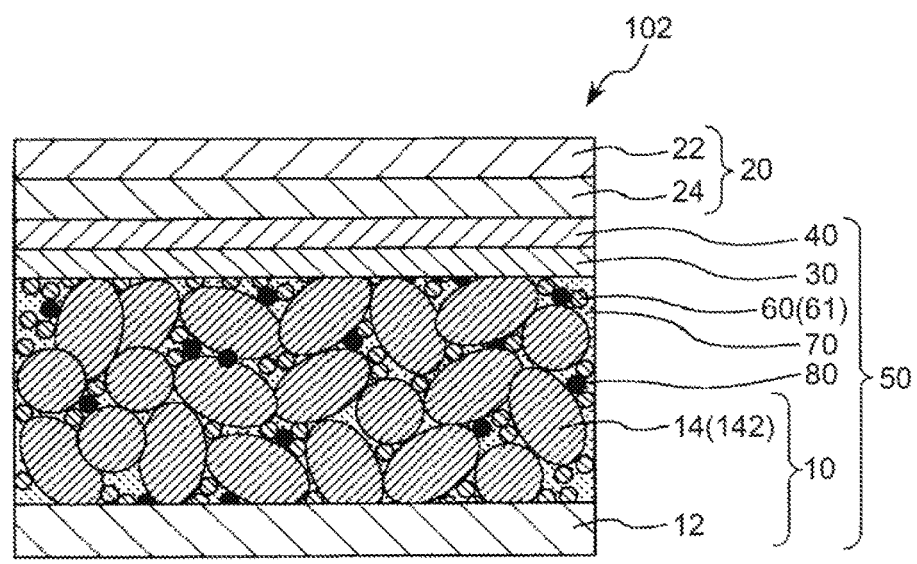
FIG. 3 is a longitudinal cross-sectional view showing a lithium secondary battery to which a third embodiment of the solid electrolyte battery according to the invention is applied.

FIG. 3 is a longitudinal cross-sectional view showing a lithium secondary battery to which a third embodiment of the solid electrolyte battery according to the invention is applied.

Hereinafter, a lithium secondary battery 102 according to the third embodiment will be described, however, in the following description, different points from the lithium secondary battery 101 according to the second embodiment will be mainly described, and the description of the same matter will be omitted.

The lithium secondary battery 102 shown in FIG. 3 is the same as the lithium secondary battery 101 shown in FIG. 2 except that the lithium secondary battery 102 further includes noble metal particles 80 dispersed in gaps of a positive electrode active material layer 14. That is, an electrode assembly 50 according to this embodiment includes a positive electrode 10, a first solid electrolyte layer 30, a second solid electrolyte layer 40, a third solid electrolyte layer 60, a fourth solid electrolyte layer 70, and the noble metal particles 80.

The noble metal particle 80 is in the form of a particle, and is adhered to the surface of an active material particle 142 or is interposed between the active material particles 142.

The noble metal particle 80 may be any as long as it contains a noble metal described below, but preferably contains a noble metal having a melting point of 1000° C. or higher as a forming material (constituent material). According to this, the noble metal particle 80 mediates the transfer of electrons between the active material particles 142 so that the transfer of electrons can be more smoothly performed. Further, the transfer of electrons between the active material particles 142 is stably maintained over a long period of time. Due to this, by applying the electrode assembly 50 having such a configuration to the lithium secondary battery 102, the lithium secondary battery 102 stably maintains a high output power and a high capacity over a long period of time.

The noble metal having a melting point of 1000° C. or higher is not particularly limited, however, examples thereof include gold (Au, melting point: 1061° C.), platinum (Pt, melting point: 1768° C.), palladium (Pd, melting point: 1554° C.), rhodium (Rh, melting point: 1964° C.), iridium (Ir, melting point: 2466° C.), ruthenium (Ru, melting point: 2334° C.), and osmium (Os, melting point: 3033° C.), and these metals can be used alone or an alloy of these metals may be used. Among these, at least one metal selected from platinum and palladium is preferred. These noble metals are relatively inexpensive among the noble metals and are easy to handle, and also have excellent electron conductivity. Due to this, by using such a metal as a constituent material of the noble metal particles 80, the transfer of electrons between the active material particles 142 can be more smoothly performed and also can be more stably maintained over a long period of time.

The average particle diameter of the noble metal particles 80 is preferably 0.1 µm or more and 10 µm or less, more preferably 0.1 µm or more and 5 µm or less. The average particle diameter of the noble metal particles 80 can be measured using the same method as used for measuring the average particle diameter of the active material particles 142.

The content of the noble metal particles 80 in the positive electrode active material layer 14 is preferably 0.1 mass % or more and 10 mass % or less, more preferably 1 mass % or more and 10 mass % or less.

In addition, by adopting a resin core structure or a hollow structure for the noble metal particles 80, the using amount of the noble metal particles 80 can be reduced.

By setting the average particle diameter and the content of the noble metal particles 80 within the above ranges, respectively, the noble metal particles 80 can be more reliably adhered to the surfaces of the active material particles 142 or can be more reliably interposed between the active material particles 142. As a result, the transfer of electrons between the active material particles 142 can be more smoothly performed and also can be more stably maintained over a long period of time.

Such a positive electrode active material layer 14 can be produced by, for example, adding the noble metal particles 80 along with the active material particles 142 in the below-mentioned method for producing a lithium secondary battery.

Also such a lithium secondary battery 102 according to the third embodiment can bring about the same effect as in the above-mentioned second embodiment.

Fourth Embodiment

Next, a sodium secondary battery to which a fourth embodiment of the solid electrolyte battery according to the invention is applied, and a fourth embodiment of the electrode assembly according to the invention to be included therein will be described.

Hereinafter, a sodium secondary battery according to the fourth embodiment will be described, however, in the following description, different points from the lithium secondary battery according to the third embodiment will be mainly described, and the description of the same matter will be omitted.

The sodium secondary battery according to this embodiment is the same as the lithium secondary butteries according to the first to third embodiments except that a sodium ion is used as a charge carrier and also the constituent materials of the respective portions are changed accordingly.

For example, a positive electrode active material contained in a positive electrode active material layer according to this embodiment is not particularly limited as long as it is a material which can reversibly occlude and release a sodium ion, and a material known as a positive electrode active material for a sodium secondary battery is used. Specific examples thereof include $Na_{2/3}Ni_xMn_{1-x}O_2$ (wherein x is less than ⅓).

On the other hand, as a negative electrode active material contained in a negative electrode active material layer according to this embodiment, for example, a material known as a negative electrode active material for a sodium secondary battery such as a metal which can form an alloy with sodium (for example, germanium, indium, tin, or the like), an alloy of such a metal with sodium, or hard carbon is used.

A first inorganic solid electrolyte contained in a first solid electrolyte layer according to this embodiment is not particularly limited as long as it is sodium oxide containing sodium and oxygen as constituent elements, however, in particular, sodium oxide containing at least one element selected from boron, carbon, silicon, germanium, phosphorus, and aluminum other than sodium and oxygen as constituent elements is preferably used. Examples of such a sodium oxide include $Na_{1+x}Al_{11}O_{17+2/x}$ (0.15<x<0.3) and $Na_{1+x}Zr_2Si_xP_{3-x}O_{12}$ (0<x<3).

Further, it is preferred that the first inorganic solid electrolyte does not contain nitrogen in the same manner as in the first to third embodiments. According to this, the nitriding of the active material contained in the positive electrode active material layer can be minimized. As a result, the impairment of the function of the positive electrode active material layer by nitriding can be suppressed.

On the other hand, a second inorganic solid electrolyte contained in a second solid electrolyte layer according to this embodiment contains sodium, nitrogen, and oxygen as constituent elements. In particular, sodium oxide containing at least one element selected from boron, carbon, silicon, germanium, phosphorus, and aluminum other than sodium, nitrogen, and oxygen as constituent elements is preferably used. Examples of such sodium oxide include compounds obtained by substituting part of the oxygen atoms in $Na_{1+x}Al_{11}O_{17+2/x}$ (0.15<x<0.3) or $Na_{1+x}Zr_2Si_xP_{3-x}O_{12}$ (0<x<3) with a nitrogen atom. The substitution ratio is not particularly limited, but is preferably about 1% or more and 50% or less of the total oxygen atoms.

Such a second solid electrolyte layer can form an interface with a small interface resistance to the negative electrode active material layer. According to this, the sodium secondary battery having a small internal resistance and excellent output power characteristics is obtained.

Hereinabove, the sodium secondary battery has been described, however, as described above, in the solid electrolyte battery according to this invention, the metal (first metal) capable of forming a metal ion (first metal ion) serving as a charge carrier is not limited to lithium and sodium.

Examples of the metal capable of forming a metal ion serving as a charge carrier include alkali metals, Group 2 elements, aluminum, and silver. Among these, at least one or more metal elements selected from the group consisting of alkali metals and Group 2 elements are preferably used. An alkali metal has one outermost electron and easily releases the electron, and therefore is particularly useful as the metal capable of forming a charge carrier. Further, a Group 2 element has two outermost electrons and easily releases the electrons, and also can transport a plurality of electrons by one charge carrier, and therefore can increase the capacity of the solid electrolyte battery.

Also such a sodium secondary battery according to the fourth embodiment can bring about the same effect as in the above-mentioned first to third embodiments.

Method for Producing Lithium Secondary Battery

Next, a method for producing the lithium secondary battery 101 according to the second embodiment described above (an embodiment of the method for producing a solid electrolyte battery according to the invention) will be described. The method for producing a solid electrolyte battery other than the lithium secondary battery is also the same as the below-mentioned method, and therefore, hereinafter, a case of the lithium secondary battery will be described as an example.

Each of FIGS. 4A to 11B is a view for illustrating the method for producing the lithium secondary battery 101 shown in FIG. 2.

[1] First, two methods for producing the positive electrode active material layer 14 will be described.

Figure 4A:
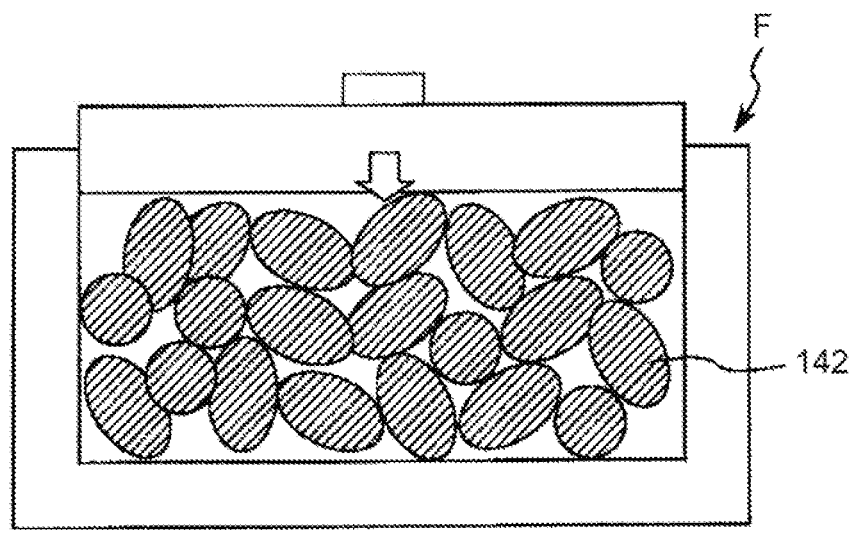
FIGS. 4A and 4B are views for illustrating a method for producing the lithium secondary battery shown in FIG. 2.
Figure 4B:
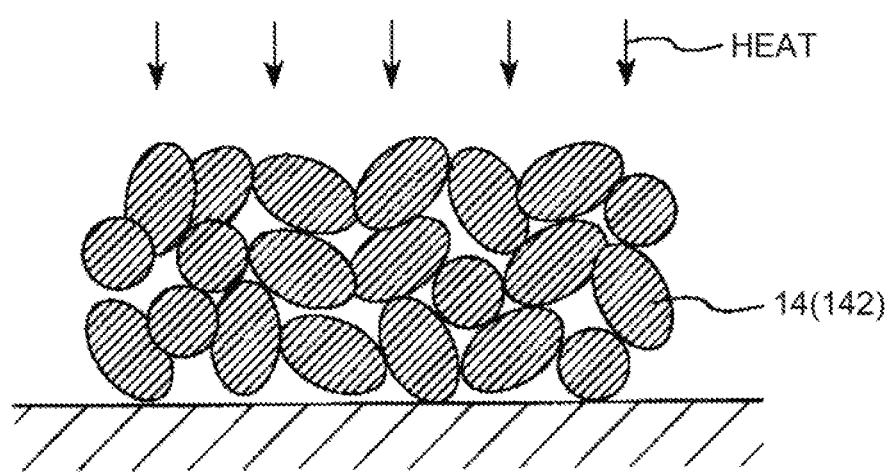

[1-1] FIGS. 4A and 4B are views for illustrating a first method for producing the positive electrode active material layer 14.

In the first method, first, a plurality of active material particles 142 in the form of particles are three-dimensionally connected to one another by heating, whereby the positive electrode active material layer 14 composed of a porous body is obtained.

As shown in FIGS. 4A and 4B, the positive electrode active material layer 14 can be obtained by, for example, compression-molding the plurality of active material particles 142 using a mold F with a cavity corresponding to the outer shape of the positive electrode active material layer 14 to be formed (see FIG. 4A), and thereafter, subjecting the obtained compression-molded material to a heat treatment, (see FIG. 4B).

This heat treatment is preferably performed at a treatment temperature of 850° C. or higher and lower than the melting point of the lithium multiple oxide (the forming material of the active material particles 142) to be used. By this heat treatment, a molded body in which the active material particles 142 are integrated by sintering can be reliably obtained. By performing the heat treatment at a temperature in such a range, the resistivity of the positive electrode active material layer 14 to be obtained can be decreased to preferably 700 Ω·cm or less even without adding a conductive additive. Accordingly, the lithium secondary battery 101 to be obtained has a sufficient output power.

At this time, when the treatment temperature is lower than 850° C., not only sintering does not sufficiently proceed, but also the electron conductivity itself in the crystals of the active material is decreased depending on the type of the lithium multiple oxide to be used, and therefore, the lithium secondary battery 101 to be obtained may not be able to achieve a desired output power.

Further, when the treatment temperature exceeds the melting point of the lithium multiple oxide, lithium is excessively volatilized from the inside of the crystals of the lithium multiple oxide, and therefore, the electron conductivity of the lithium multiple oxide is decreased, and thus, the capacity of the electrode assembly 50 to be obtained may be decreased.

Accordingly, in order to obtain appropriate output power and capacity, the treatment temperature is preferably 850° C. or higher and lower than the melting point of the lithium multiple oxide, more preferably 875° C. or higher and 1000° C. or lower, further more preferably 900° C. or higher and 920° C. or lower.

Further, the heat treatment in this step is preferably performed for 5 minutes or more and 36 hours or less, more preferably performed for 4 hours or more and 14 hours or less.

By performing the heat treatment as described above, grain boundary growth in the active material particles 142 and sintering between the active material particles 142 are allowed to proceed so that the retention of the shape of the obtained positive electrode active material layer 14 is facilitated, and thus, the addition amount of a binder in the positive electrode active material layer 14 can be reduced. Further, a bond is formed between the active material particles 142 by sintering so as to form an electron transfer pathway between the active material particles 142, and therefore, also the addition amount of a conductive additive can be reduced.

As the forming material of the active material particles 142, $LiCoO_2$ can be favorably used. According to this, the above-mentioned effect can be more remarkably exhibited. That is, the positive electrode active material layer 14 in which the active material particles 142 are integrated by sintering can be more reliably obtained.

Further, the obtained positive electrode active material layer 14 is constituted by communication holes in which a plurality of pores of the positive electrode active material layer 14 communicate with one another like a net in the inside of the positive electrode active material layer 14.

Further, to the forming material to be used for forming the active material particles 142, an organic polymer compound such as polyvinylidene fluoride (PVdF) or polyvinyl alcohol (PVA) may be added as a binder. Such a binder is burned or oxidized in the heat treatment in this step, and the amount thereof is reduced.

Further, it is preferred that to the forming material to be used, a pore-forming material in the form of particles composed of a polymer or a carbon powder is added as a pore template when performing compact molding. By mixing such a pore-forming material, the control of the porosity of the positive electrode active material layer 14 is facilitated. Such a pore-forming material is decomposed and removed by burning or oxidation during the heat treatment, and therefore, the amount thereof is reduced in the obtained positive electrode active material layer 14.

The average particle diameter of the pore-forming material is preferably 0.5 µm or more and 10 µm or less.

Further, it is preferred that the pore-forming material includes particles (first particles) composed of a substance having a deliquescent property. When the first particles deliquesce, water generated around the first particles functions as a binder for bonding the lithium multiple oxide in the form of particles, and therefore, it becomes possible to maintain the shape while the lithium multiple oxide in the form of particles are compression-molded and subjected to a heat treatment. Accordingly, the active material molded body can be obtained without adding an additional binder or while reducing the addition amount of a binder, and the electrode assembly 50 having a high capacity can be easily obtained.

Examples of such first particles include particles composed of polyacrylic acid.

Further, it is preferred that the pore-forming material further includes particles (second particles) composed of a substance having no deliquescent property. The pore-forming material including such second particles becomes easy to handle. Further, when the pore-forming material has a deliquescent property, the porosity of the electrode assembly 50 sometimes deviates from the desired set value depending on the amount of water around the pore-forming material, however, by including the second particles which do not deliquesce along with the first particles in the pore-forming material, it becomes possible to prevent the porosity from deviating from the desired set value.

By the first method as described above, the positive electrode active material layer 14 can be obtained.

[1-2] Next, a second method for producing the positive electrode active material layer 14 will be described. The positive electrode active material layer 14 may be obtained by using a method in which a slurry containing the active material particles 142 is heated other than the method in which the positive electrode active material layer 14 is obtained by compression-molding the active material particles 142, followed by heating as described above.

Figure 5A:
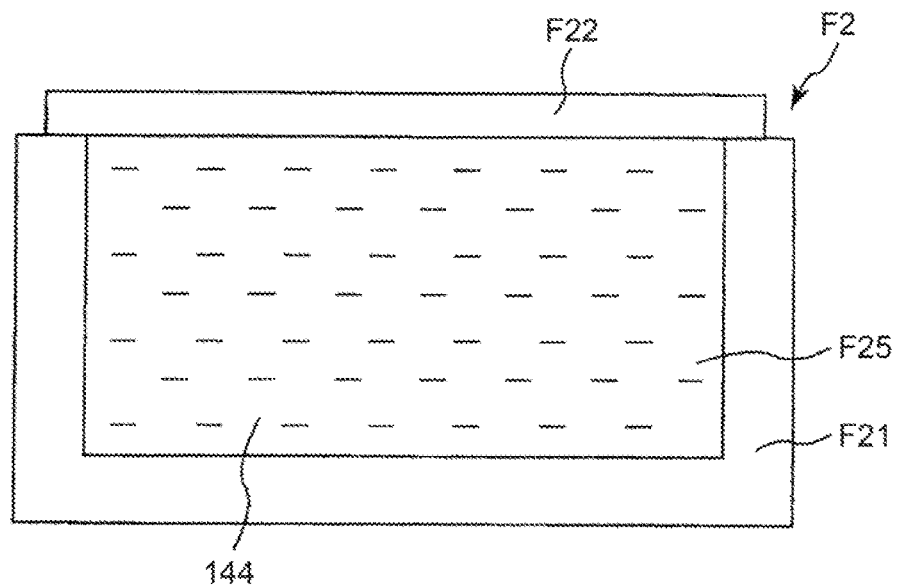
FIGS. 5A and 5B are views for illustrating a method for producing the lithium secondary battery shown in FIG. 2.
Figure 5B:
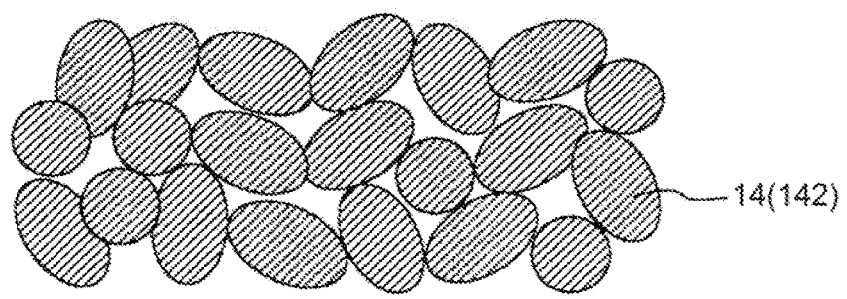

FIGS. 5A and 5B are views for illustrating the second method for producing the positive electrode active material layer 14.

The second method includes a preparation step of preparing a slurry containing the active material particles 142 and a drying step of obtaining the positive electrode active material layer 14 by heating the slurry. Hereinafter, these steps will be described.

First, a binder is dissolved in a solvent, and the active material particles 142 are dispersed therein, whereby a slurry 144 is prepared. In the slurry 144, a dispersant such as oleylamine may be contained.

Subsequently, a mold F2 having a bottom portion F21 including a concave portion F25 and a lid portion F22 is prepared, and the slurry 144 is added dropwise into the concave portion F25 of the bottom portion F21, and thereafter, the bottom portion F21 is covered with the lid portion F22 (see FIG. 5A).

The total content of the active material particles 142 in the slurry 144 is preferably 10 mass % or more and 60 mass % or less, more preferably 30 mass % or more and 50 mass % or less. According to this, as described below, the positive electrode active material layer 14 having a high filling factor is obtained.

The binder is not particularly limited, however, examples thereof include other than polycarbonate, a cellulose-based binder, an acrylic binder, a polyvinyl alcohol-based binder, and a polyvinyl butyral-based binder, and among these, one type or two or more types in combination can be used.

The solvent is not particularly limited, but is preferably, for example, an aprotic solvent. According to this, the deterioration of the active material particles 142 due to the contact with the solvent can be reduced.

Specific examples of such an aprotic solvent include butanol, ethanol, propanol, methyl isobutyl ketone, toluene, and xylene, and a single solvent or a mixed solvent thereof can be used as the solvent.

Subsequently, by heating the slurry 144 containing the active material particles 142, the slurry 144 is dried, and also the active material particles 142 contained in the slurry 144 are sintered with each other, whereby the positive electrode active material layer 14 is obtained (see FIG. 5B).

The heating temperature when heating the slurry 144 is set in the same manner as the condition when performing the heat treatment of the compression-molded body described above.

Further, the heating of the slurry 144 is preferably performed by a multistage heat treatment in which the temperature condition is increased stepwise. For example, it is preferred that after the slurry is dried at room temperature, the temperature is increased from room temperature to 300° C. over 2 hours, and then further increased to 1000° C. over 2 hours, and thereafter, firing is performed at 1000° C. for 8 hours. By increasing the temperature under such a condition, the binder contained in the solvent can be reliably burned off.

Also by the second method as described above, the positive electrode active material layer 14 can be obtained.

[2] Next, four methods for impregnating the positive electrode active material layer 14 with the third solid electrolyte layer 60 and the fourth solid electrolyte layer 70 will be described.

[2-1] Each of FIGS. 6A to 7B is a view for illustrating a first method for impregnating the positive electrode active material layer 14 with the third solid electrolyte layer 60 and the fourth solid electrolyte layer 70.

Figure 6A:
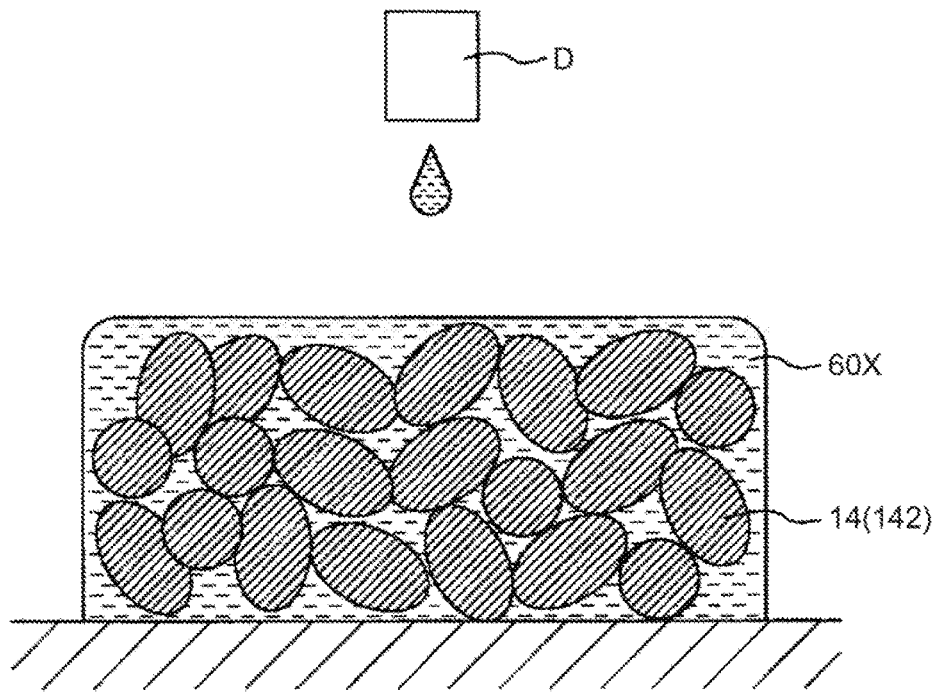
FIGS. 6A and 6B are views for illustrating a method for producing the lithium secondary battery shown in FIG. 2.
Figure 6B:
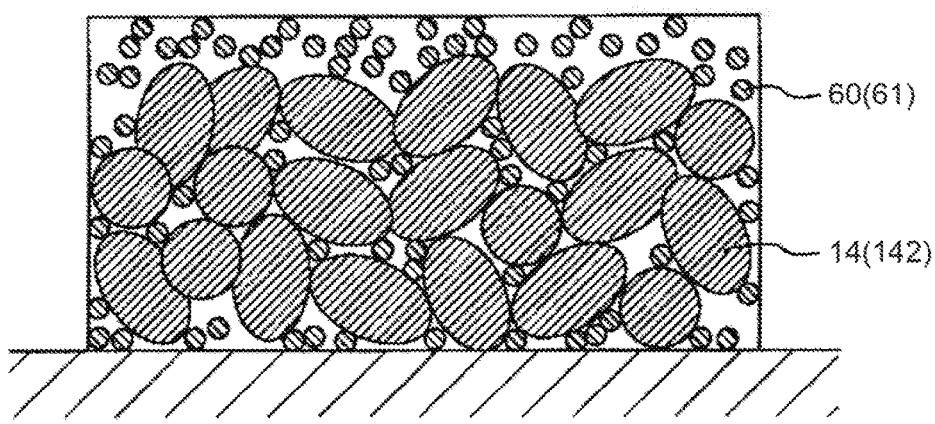

In the first method, as shown in FIGS. 6A and 6B, first, a liquid 60X containing a precursor of the third inorganic solid electrolyte is applied to the surface of the positive electrode active material layer 14 including the inside of the pores of the positive electrode active material layer 14 with a dispenser D to impregnate the surface with the liquid (see FIG. 6A), followed by firing to convert the precursor to the third inorganic solid electrolyte, whereby the third solid electrolyte layer 60 is formed (see FIG. 6B).

The liquid 60X may contain a solvent which can dissolve the precursor in addition to the precursor. In the case where the liquid 60X contains a solvent, after applying the liquid 60X, the solvent may be appropriately removed before firing. In the removal of the solvent, one method or two or more methods in combination selected from generally known methods such as heating, pressure reduction, and air-blowing can be adopted.

Since the third solid electrolyte layer 60 is formed by applying the liquid 60X having fluidity, the third solid electrolyte layer 60 is formed also on the inner surface of each pore of the fine positive electrode active material layer 14. Due to this, a contact area between the positive electrode active material layer 14 and the third solid electrolyte layer 60 is easily increased so that the lithium ion conduction resistance at the interface between the positive electrode active material layer 14 and the third solid electrolyte layer 60 is decreased. As a result, the output power of the lithium secondary battery 101 is increased.

The third inorganic solid electrolyte is produced by firing (heating) a precursor of the third inorganic solid electrolyte as described below, and at least part of the produced third inorganic solid electrolyte forms particulate bodies 61 composed of secondary particles formed by granulating the primary particles thereof during this firing. Therefore, at least part of the third solid electrolyte layer 60 is formed as an assembly of the particulate bodies 61 in the inside of the pore (gap) of the fine positive electrode active material layer 14. Due to this, also at least the part of the third solid electrolyte layer 60 is formed as a porous body in the same manner as the positive electrode active material layer 14. Therefore, the third solid electrolyte layer 60 is formed so as to fill the inside of the gap of the positive electrode active material layer 14, however, even by this filling, part of the gaps remain in some cases.

Examples of the precursor of the third inorganic solid electrolyte include the following (A), (B), and (C).

(A) a composition including a salt which contains metal atoms to be contained in the third inorganic solid electrolyte at a ratio according to the compositional formula of the third inorganic solid electrolyte, and is converted to the third inorganic solid electrolyte by oxidation (B) a composition including a metal alkoxide which contains metal atoms to be contained in the third inorganic solid electrolyte at a ratio according to the compositional formula of the third inorganic solid electrolyte (C) a dispersion liquid in which the third inorganic solid electrolyte in the form of fine particles or a sol in the form of fine particles containing metal atoms to be contained in the third inorganic solid electrolyte at a ratio according to the compositional formula of the third inorganic solid electrolyte is dispersed in a solvent, or in (A) or (B)

The salt to be contained in (A) includes a metal complex. Further, (B) is a precursor when the third inorganic solid electrolyte is formed using a so-called sol-gel method. From (A) or (B), the particulate bodies 61 are produced by the reaction of the precursor, and from (C), the particulate bodies 61 are produced by removing the dispersion medium.

The firing of the precursor of the third inorganic solid electrolyte is performed in an air atmosphere at a temperature lower than the temperature in the heat treatment for obtaining the positive electrode active material layer 14 described above. Specifically, the firing may be performed at a firing temperature in the range of 300° C. or higher and 900° C. or lower. By the firing, the third inorganic solid electrolyte is produced from the precursor, thereby forming the third solid electrolyte layer 60.

By performing the firing at a temperature in such a range, the occurrence of a solid-phase reaction at the interface between the positive electrode active material layer 14 and the third solid electrolyte layer 60 due to mutual diffusion of elements constituting the respective layers can be suppressed, and thus, the production of electrochemically inactive by-products can be suppressed. Further, the crystallinity of the third inorganic solid electrolyte is improved, and thus, the ion conductivity of the third solid electrolyte layer 60 can be improved. In addition, at the interface between the positive electrode active material layer 14 and the third solid electrolyte layer 60, an intermediate layer is generated, and thus, the transfer of the charge carrier at the interface is facilitated. Accordingly, the capacity and output power of the solid electrolyte battery using the electrode assembly 50 are improved.

The firing may be performed by performing the heat treatment once, or may be performed by dividing the heat treatment into a first heat treatment in which the precursor is adhered to the surface of the porous body and a second heat treatment in which heating is performed under a temperature condition of not lower than the treatment temperature in the first heat treatment and 900° C. or lower. By performing the firing by such a stepwise heat treatment, the third solid electrolyte layer 60 can be easily formed at a desired position.

Figure 7A:
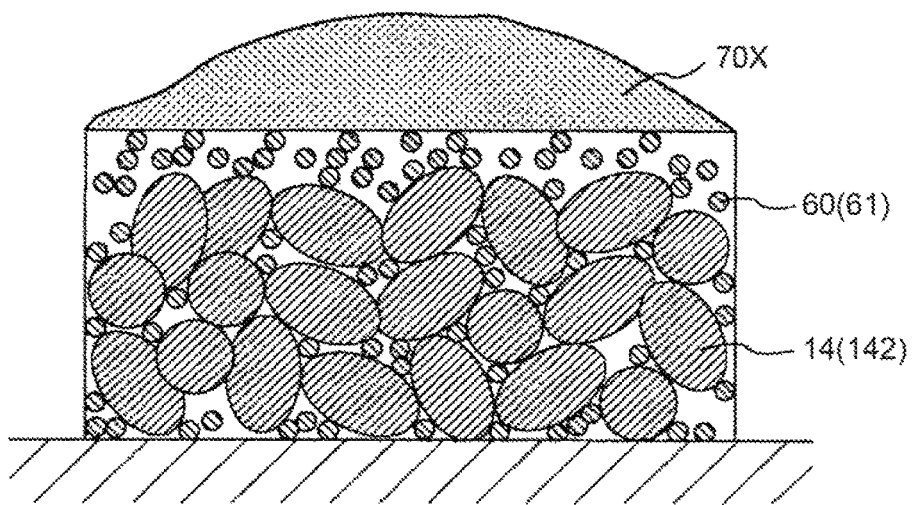
FIGS. 7A and 7B are views for illustrating a method for producing the lithium secondary battery shown in FIG. 2.
Figure 7B:
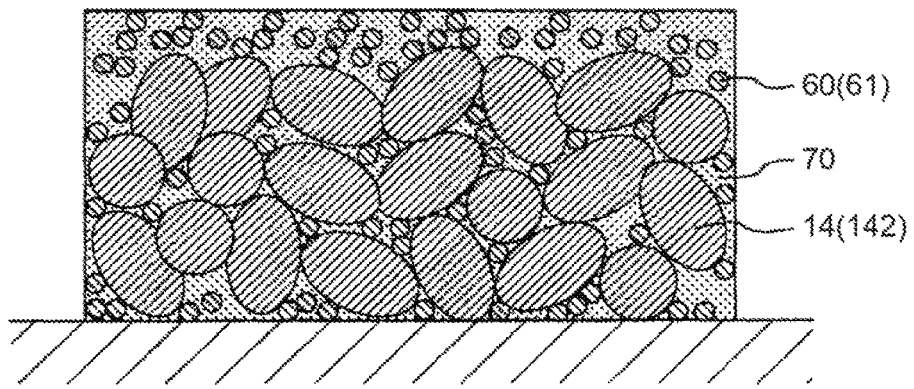

Subsequently, as shown in FIG. 7A, a powder 70X (solid material) of the fourth inorganic solid electrolyte is supplied to the surfaces of the positive electrode active material layer 14 and the third solid electrolyte layer 60.

The place where the powder 70X is supplied is not particularly limited as long as it is a place where the powder 70X comes in contact with the positive electrode active material layer 14 and the third solid electrolyte layer 60, and may be the upper surface, or the side surface, or the entire surface.

The average particle diameter of the powder 70X is not particularly limited, but is preferably 0.5 µm or more and 500 µm or less, more preferably 1 µm or more and 100 µm or less. By setting the average particle diameter of the powder 70X within the above range, when the powder 70X is heated, the entire powder 70X can be uniformly melted in a short time. Due to this, the molten material can be impregnated more throughout the inside of the pores of the positive electrode active material layer 14.

The average particle diameter of the powder 70X can be obtained, for example, as a particle diameter at 50% from a small particle diameter side on a mass basis in a particle size distribution obtained by laser diffractometry.

Subsequently, the powder 70X is heated. By doing this, the power 70X is melted, and the molten material of the fourth inorganic solid electrolyte is produced. This molten material of the fourth inorganic solid electrolyte is impregnated into the gaps which are pores of the positive electrode active material layer 14 and are not filled with the third solid electrolyte layer 60. That is, the molten material of the fourth inorganic solid electrolyte is in the form of a liquid and therefore has excellent fluidity characteristic of a liquid. Due to this, the molten material can be efficiently impregnated also into a narrow gap. Then, as described below, by solidifying the molten material impregnated into the gaps, the fourth solid electrolyte layer 70 which fills the pores of the positive electrode active material layer 14 at a higher filling factor is obtained.

Further, in this method, the molten material of the powder 70X is impregnated, and therefore, for example, as compared with a method in which a dispersion liquid obtained by dispersing the powder 70X in a dispersion medium or the like is impregnated, the volume reduction during solidification can be minimized. In other words, since a material which should be removed such as a dispersion medium is not contained, and therefore, the volume reduction during solidification can be decreased by that amount. Due to this, the fourth solid electrolyte layer 70 can fill the inside of the pores of the positive electrode active material layer 14 without gaps, and thus can contribute to the realization of more stable charge-discharge cycles.

The heating temperature of the powder 70X may be equal to or higher than the melting point of the fourth inorganic solid electrolyte, but is preferably lower than 800° C. According to this, the occurrence of mutual diffusion between the third solid electrolyte layer 60 and the fourth solid electrolyte layer 70 can be suppressed. As a result, the deterioration of the characteristics of the third solid electrolyte layer 60 and the fourth solid electrolyte layer 70 can be suppressed. Incidentally, the heating temperature of the powder 70X is, for example, 650° C. or higher and 750° C. or lower.

The heating time of the powder 70X is not particularly limited as long as it is a time in which the entire powder 70X can be melted, but is, for example, preferably about 1 minute or more and 2 hours or less, more preferably about 3 minutes or more and 1 hour or less.

Subsequently, the molten material of the powder 70X is solidified. By doing this, the molten material is solidified and also crystallized in the pores of the positive electrode active material layer 14. As a result, the fourth solid electrolyte layer 70 which is a crystalline material is formed (see FIG. 7B).

The solidification of the molten material may be performed by a method in which the molten material is left as it is (natural heat dissipation), or by a method in which heat is forcibly dissipated from the molten material. However, when the molten material is rapidly cooled, a large thermal shock may be applied to the material depending on the cooling speed, and therefore, it is preferred to solidify the molten material by slow cooling.

In the case where the fourth solid electrolyte layer 70 to be formed contains a crystal, the grain size of the crystal can be made relatively small by setting the heat dissipation speed high, and on the other hand, the grain size of the crystal to be formed can be made relatively large by setting the heat dissipation speed low. Therefore, by appropriately changing the heat dissipation speed, the grain size of the crystal contained in the fourth solid electrolyte layer 70 can be adjusted.

As described above, the positive electrode active material layer 14 can be impregnated with the third solid electrolyte layer 60 and the fourth solid electrolyte layer 70.

Figure 8A:
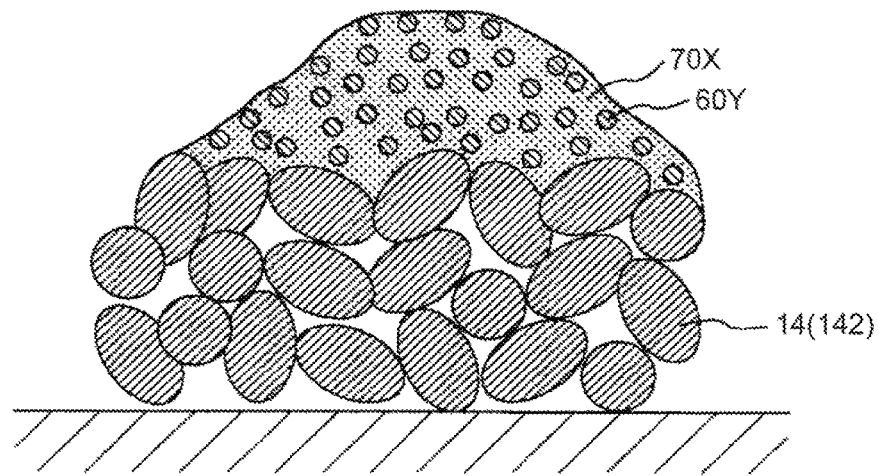
FIGS. 8A and 8B are views for illustrating a method for producing the lithium secondary battery shown in FIG. 2.
Figure 8B:
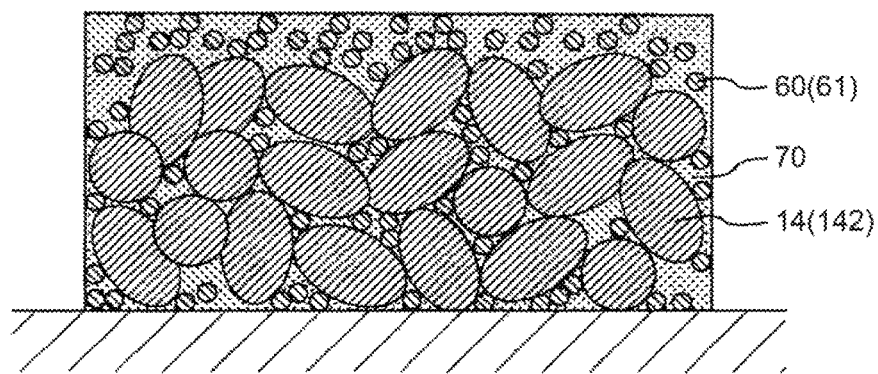

[2-2] FIGS. 8A and 8B are views for illustrating a second method for impregnating the positive electrode active material layer 14 with the third solid electrolyte layer 60 and the fourth solid electrolyte layer 70. In the following description, different points from the first method will be mainly described, and the description of the same matter will be omitted.

In the second method, first, as shown in FIG. 8A, a powder 60Y (solid material) of the third inorganic solid electrolyte and a powder 70X (solid material) of the fourth inorganic solid electrolyte are supplied to the surface of the positive electrode active material layer 14.

The place where the powder 60Y and the powder 70X are supplied is not particularly limited as long as it is a place where the powder 60Y and the powder 70X come in contact with the positive electrode active material layer 14, and may be the upper surface, or the side surface, or the entire surface.

Subsequently, the powder 70X is heated. By doing this, the powder 70X is melted, and the molten material of the fourth inorganic solid electrolyte is produced. This molten material of the fourth inorganic solid electrolyte is impregnated into the pores of the positive electrode active material layer 14. That is, the molten material of the fourth inorganic solid electrolyte is in the form of a liquid and therefore has excellent fluidity characteristic of a liquid. Due to this, the molten material can be efficiently impregnated also into a narrow pore. Then, as described below, by solidifying the molten material impregnated into the pores, the fourth solid electrolyte layer 70 which fills the pores of the positive electrode active material layer 14 at a higher filling factor is obtained.

Further, in the second method, as the fourth inorganic solid electrolyte, an inorganic solid electrolyte having a lower melting point than the third inorganic solid electrolyte is selected. By selecting such a fourth inorganic solid electrolyte, when the powder 70X is melted by heating, the powder 60Y can be prevented from melting by appropriately setting the heating temperature.

Therefore, the heating temperature of the powder 70X is set to be equal to or higher than the melting point of the fourth inorganic solid electrolyte and lower than the melting point of the third inorganic solid electrolyte.

Incidentally, by using an inorganic solid electrolyte containing boron as the fourth inorganic solid electrolyte, the melting point of the solid electrolyte can be decreased, although it slightly varies depending on the overall composition. Therefore, in this embodiment, by using a boron-containing electrolyte as the fourth inorganic solid electrolyte, the melting point of the fourth inorganic solid electrolyte can be easily adjusted to be lower than the melting point of the third inorganic solid electrolyte. In other words, by using a boron-containing electrolyte, the fourth inorganic solid electrolyte having a lower melting point than the third inorganic solid electrolyte, can be realized without sacrificing the characteristics as the solid electrolyte such as lithium ion conductivity and an insulating property. Accordingly, while maintaining the lithium ion conductivity in the electrode assembly 50, the filling factor of the electrolyte can be increased.

Further, in this method, a method in which the molten material of the powder 70X is impregnated is adopted, and therefore, for example, as compared with a method in which a dispersion liquid obtained by dispersing the powder 70X in a dispersion medium or the like is impregnated, the volume reduction during solidification can be minimized. In other words, since a material which should be removed such as a dispersion medium is not contained, and therefore, the volume reduction during solidification can be decreased by that amount. Due to this, the fourth solid electrolyte layer 70 can further fill the inside of the pores of the positive electrode active material layer 14 without gaps, and thus can contribute to the realization of more stable charge-discharge cycles.

In addition, by supplying the powder 60Y and the powder 70X to the same place, the powder 60Y is incorporated in the melted powder 70X. Due to this, the molten material in the form of a liquid in which the powder 60Y is dispersed is formed. In the molten material containing the powder 60Y in this manner, while maintaining the property of the powder 60Y as a powder, the powder 60Y has a liquid form as a whole.

Accordingly, by melting the powder 70X, the molten material of the powder 70X can be allowed to penetrate into the pores of the positive electrode active material layer 14 along with the powder 60Y. As a result, the powder 60Y can be sent into the pores of the positive electrode active material layer 14 by utilizing the fluidity of the molten material of the powder 70X as a driving force.

Therefore, in the end, the pores of the positive electrode active material layer 14 can be filled with each of the third solid electrolyte layer 60 and the fourth solid electrolyte layer 70 at a high filling factor.

The average particle diameter of the powder 60Y is not particularly limited, but is preferably 0.5 μm or more and 500 μm or less, more preferably 1 μm or more and 100 μm or less. By setting the average particle diameter of the powder 60Y within the above range, the powder 60Y can be made to efficiently penetrate into the pores of the positive electrode active material layer 14. As a result, the powder 60Y can be impregnated more throughout the inside of the pore of the positive electrode active material layer 14.

The average particle diameter of the powder 60Y can be obtained, for example, as a particle diameter at 50% from a small particle diameter side on a mass basis in a particle size distribution obtained by laser diffractometry.

Subsequently, the molten material of the powder 70X is solidified. By doing this, the molten material is solidified, whereby the fourth solid electrolyte layer 70 is formed (see FIG. 8B).

The solidification of the molten material may be performed by a method in which the molten material is left as it is (natural heat dissipation), or by a method in which heat is forcibly dissipated from the molten material. However, when the molten material is rapidly cooled, a large thermal shock may be applied to the material depending on the cooling speed, and therefore, it is preferred to solidify the molten material by slow cooling.

In the case where the fourth solid electrolyte layer 70 to be formed contains a crystal, the grain size of the crystal can be made relatively small by setting the heat dissipation speed high, and on the other hand, the grain size of the crystal to be formed can be made relatively large by setting the heat dissipation speed low. Therefore, by appropriately changing the heat dissipation speed, the grain size of the crystal contained in the fourth solid electrolyte layer 70 can be adjusted.

Further, at least part of the powder 60Y is aggregated, whereby a particulate body 61 is formed. By doing this, the third solid electrolyte layer 60 is formed.

As described above, the positive electrode active material layer 14 can be impregnated with the third solid electrolyte layer 60 and the fourth solid electrolyte layer 70.

Figure 9A:
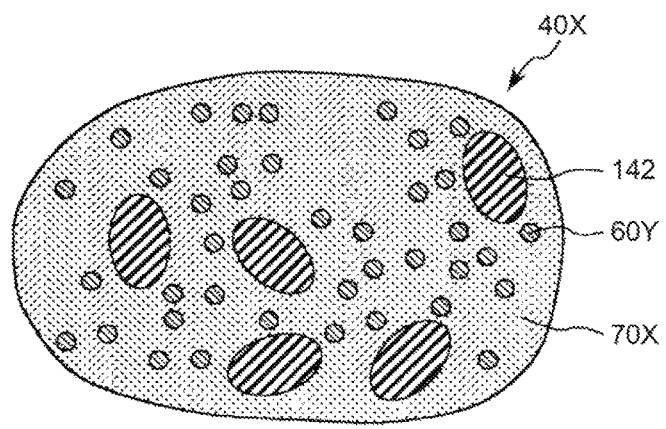
FIGS. 9A and 9B are views for illustrating a method for producing the lithium secondary battery shown in FIG. 2.
Figure 9B:
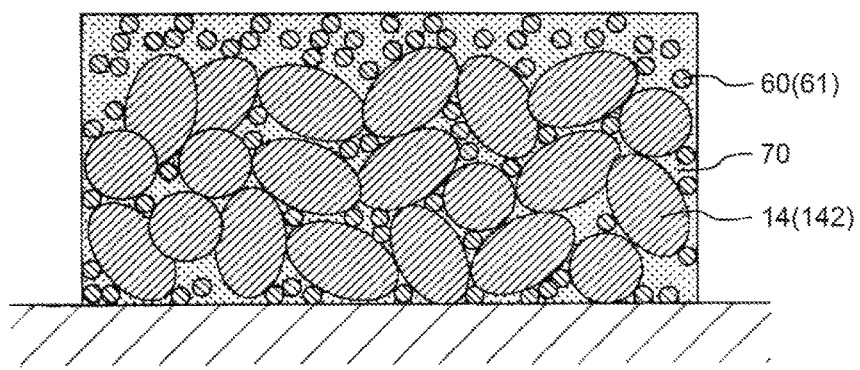

[2-3] FIGS. 9A and 9B, are views for illustrating a third method for impregnating the positive electrode active material layer 14 with the third solid electrolyte layer 60 and the fourth solid electrolyte layer 70. In the following description, different points from the first method and the second method will be mainly described, and the description of the same matter will be omitted.

In the third method, first, as shown in FIG. 9A, the active material particles 142, the powder 60Y of the third inorganic solid electrolyte, and the powder 70X of the fourth inorganic solid electrolyte are mixed, and this mixed powder 40X is molded into an arbitrary shape, followed by heating, whereby the third solid electrolyte layer 60 and the fourth solid electrolyte layer 70 are impregnated.

In the molding, an arbitrary mold is used. Then, the mixed powder 40X is pressed while heating the mixed powder 40X, whereby a molded body containing the active material particles 142, the powder 60Y, and the powder 70X is obtained.

In this heating and pressing treatment, a known method such as a hot-press sintering method or an electric current sintering method can be used.

As described above, the positive electrode active material layer 14 can be impregnated with the third solid electrolyte layer 60 and the fourth solid electrolyte layer 70 (see FIG. 9B).

[2-4] Although not shown in the drawings, a fourth method for impregnating the positive electrode active material layer 14 with the third solid electrolyte layer 60 and the fourth solid electrolyte layer 70 will be described.

In the fourth method, for example, the third inorganic solid electrolyte is produced in the flux of the fourth inorganic solid electrolyte. Then, the positive electrode active material layer 14 is impregnated with the obtained solution.

Thereafter, by drying the solution, the third solid electrolyte layer 60 and the fourth solid electrolyte layer 70 are formed.

As described above, the positive electrode active material layer 14 can be impregnated with the third solid electrolyte layer 60 and the fourth solid electrolyte layer 70.

[3] Thereafter, the positive electrode active material layer 14 impregnated with the third solid electrolyte layer 60 and the fourth solid electrolyte layer 70 may be remolded as needed by compressing the positive electrode active material layer 14.

Examples of the method for compressing the positive electrode active material layer 14 include a method in which the volume of the cavity of a mold is shrunk in a state where the positive electrode active material layer 14 is placed in the cavity.

As described above, the positive electrode active material layer 14 includes gaps, and the gaps are filled with the third solid electrolyte layer 60 and the fourth solid electrolyte layer 70. However, part of the gaps which are not completely filled therewith may remain. In such gaps, for example, the particulate bodies 61 are in point contact with each other, and also the active material particle 142 and the particulate body 61 are in point contact with each other. Such a point contact causes a decrease in the lithium ion conductivity in this region, and the increase in the output power of the lithium secondary battery 101 may be inhibited.

In view of this, by remolding the positive electrode active material layer 14 by compression, the gaps remaining in the positive electrode active material layer 14 are shrunk. Since the particulate bodies 61 are generally harder than the active material particles 142, when the positive electrode active material layer 14 is compressed, the active material particles 142 slide over each other, whereby the positive electrode active material layer 14 is remolded. As a result, the gaps are shrunk, and also the particulate bodies 61 or the active material particle 142 and the particulate body 61 located across the gap come in contact with each other. Further, the contact area of those members having already been in contact with each other is increased. As a result, the lithium ion conductivity between the active material particle 142 and the particulate body 61 and between the particulate bodies 61 is further increased, and therefore, the output power of the lithium secondary battery 101 is further increased.

In addition, when the positive electrode active material layer 14 is compressed, it is preferred to heat the positive electrode active material layer 14. By doing this, the connecting force for connecting the active material particles 142 for forming the positive electrode active material layer 14 is reduced, and the active material particles 142 are made to reliably slide over each other, and thus, the gaps remaining in the positive electrode active material layer 14 can be reliably shrunk.

The temperature at which this positive electrode active material layer 14 is heated is preferably lower than the temperature in the heat treatment for obtaining the positive electrode active material layer 14 alone described in the above [1-1], and is specifically preferably in the range of 300° C. or higher and 900° C. or lower. Further, the temperature is more preferably lower than the temperature in the heat treatment when forming the third solid electrolyte layer 60 and the fourth solid electrolyte layer 70, and specifically preferably in the range of 300° C. or higher and 700° C. or lower. According to this, a solid-phase reaction occurs at the interface between the positive electrode active material layer 14 and the third solid electrolyte layer 60, at the interface between the third solid electrolyte layer 60 and the fourth solid electrolyte layer 70, and at the interface between the positive electrode active material layer 14 and the fourth solid electrolyte layer 70 due to mutual diffusion of elements constituting the respective layers, and the production of electrochemically inactive by-products can be suppressed.

In the case where the above-mentioned (B) or (C) is subjected to a heat treatment, the heat treatment for each of (B) and (C) is preferably performed for 5 minutes or more and 36 hours or less, more preferably performed for 4 hours or more and 14 hours or less.

The heating of the positive electrode active material layer 14 may be performed I) concurrently with the compression of the positive electrode active material layer 14, or II) prior to the compression of the positive electrode active material layer 14, or III) after the compression of the positive electrode active material layer 14. In addition, the heating may be performed by combining I), II), and III), but is preferably performed by combining I) and II). According to this, the gaps remaining in the positive electrode active material layer 14 can be shrunk by making the active material particles 142 reliably slide over each other without causing a crack or the like in the connection portion where the active material particles 142 are connected to each other.

In the case where the heating is performed by combining I), II), and III), when the heating temperatures for I), II), and III) are represented by I, II, and III [° C.], respectively, it is preferred to satisfy the following relationship: I≥II>III. According to this, the gaps remaining in the positive electrode active material layer 14 can be shrunk by making the active material particles 142 reliably slide over each other without causing a crack or the like in the connection portion where the active material particles 142 are connected to each other. In addition, the active material particles 142 which are made to slide over each other can be reliably connected to each other. That is, the strength of the remolded positive electrode active material layer 14 is improved.

Figure 10:
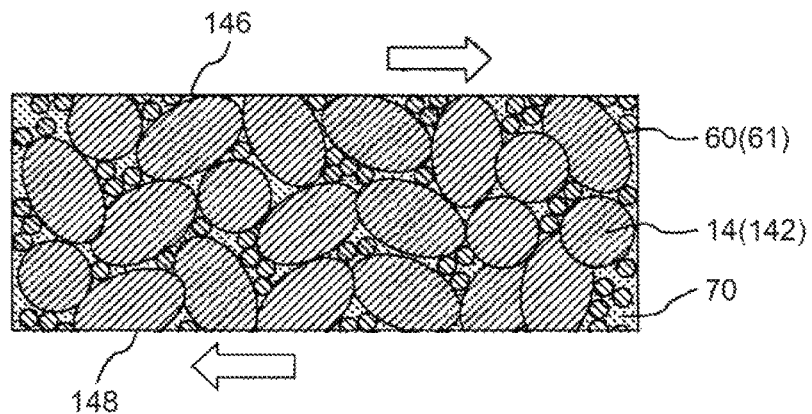
FIG. 10 is a view for illustrating a method for producing the lithium secondary battery shown in FIG. 2.

[4] Subsequently, by grinding and polishing the upper surface 146 and the lower surface 148 of the positive electrode active material layer 14, the positive electrode active material layer 14 is exposed on both surfaces (see FIG. 10).

Grinding and polishing may be performed as needed, and in the case where the active material particles 142 have already been exposed on both of the upper surface 146 and the lower surface 148 when the positive electrode active material layer 14 is produced, grinding and polishing may be omitted.

This step may be performed prior to the compression of the positive electrode active material layer 14, or during the process of production of the positive electrode active material layer 14, or during the process of impregnation of the positive electrode active material layer 14 with the third solid electrolyte layer 60 and the fourth solid electrolyte layer 70. For example, in the above-mentioned first method in which the positive electrode active material layer 14 is impregnated with the third solid electrolyte layer 60 and the fourth solid electrolyte layer 70, grinding and polishing may be performed after the precursor of the third solid electrolyte layer 60 is impregnated and before the heat treatment is performed. By doing this, the positive electrode active material whose crystallinity is decreased by grinding and polishing can be recrystallized by the heat treatment thereafter. As a result, the lithium ion conductivity in the positive electrode active material can be further increased.

Figure 11A:
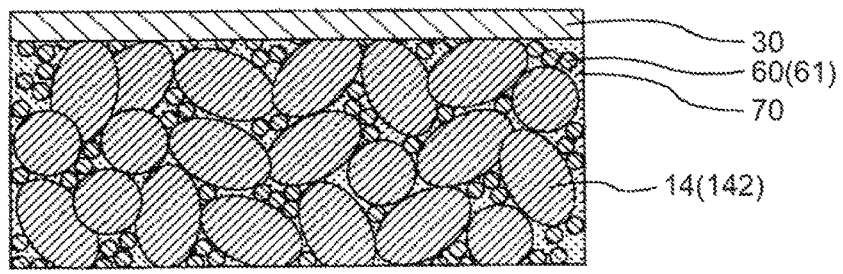
FIGS. 11A and 11B are views for illustrating a method for producing the lithium secondary battery shown in FIG. 2.

[5] Subsequently, as shown in FIG. 11A, the first solid electrolyte layer 30 is formed on the upper surface 146 of the positive electrode active material layer 14.

The first solid electrolyte layer 30 may be formed by any method, but is formed by, for example, a gas-phase deposition method such as a sputtering method or a vacuum deposition method, a liquid-phase deposition method such as a coating method or a spraying method, or the like.

Among these, according to a gas-phase deposition method, the first solid electrolyte layer 30 which is denser than the one formed by other methods can be formed. As a result, the effect exhibited by the first solid electrolyte layer 30 as described above becomes more remarkable.

For example, a film is formed on the positive electrode active material layer 14 by a sputtering method using $Li_3BO_3$ as a target in an argon gas atmosphere or a mixed gas atmosphere of argon gas and oxygen gas. As a result, lithium oxide containing lithium, boron, and oxygen as constituent elements is produced, whereby the first solid electrolyte layer 30 containing such lithium oxide is obtained.

Further, the first solid electrolyte layer 30 and the fourth solid electrolyte layer 70 may be composed of the same material, and moreover, may be formed by the same step.

Figure 11B:
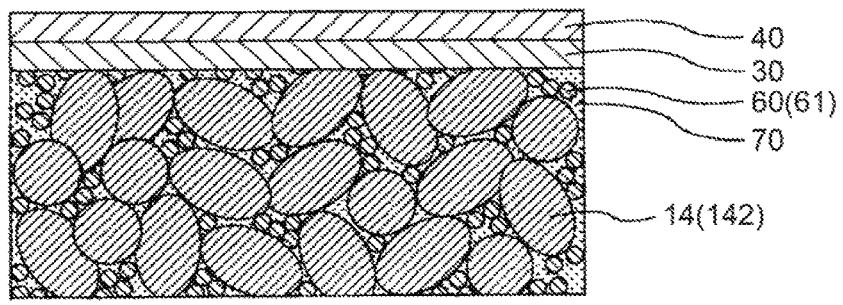

[6] Subsequently, as shown in FIG. 11B, on the upper surface of the first solid electrolyte layer 30, the second solid electrolyte layer 40 is formed.

Also the second solid electrolyte layer 40 may be formed by any method, and for example, the method is appropriately selected from the same methods as the methods for forming the first solid electrolyte layer 30. Among these, according to a gas-phase deposition method, the second solid electrolyte layer 40 which is denser than the one formed by other methods can be formed. As a result, the effect exhibited by the second solid electrolyte layer 40 as described above becomes more remarkable.

For example, a film is formed on the positive electrode active material layer 14 having the first solid electrolyte layer 30 formed thereon by a reactive sputtering method using $Li_3BO_3$ as a target in a nitrogen gas-containing atmosphere. By doing this, a film is formed by substituting part of the oxygen atoms in $Li_3BO_3$ with a nitrogen atom. As a result, lithium oxynitride containing lithium, nitrogen, boron, and oxygen as constituent elements is produced, whereby the second solid electrolyte layer 40 containing such lithium oxynitride is obtained.

Incidentally, when a film is formed by a sputtering method, the first solid electrolyte layer 30 and the second solid electrolyte layer 40 may be formed in succession. According to this, the composition at the interface between these layers is continuous, and therefore, the lithium ion conduction resistance at the interface can be further decreased.

Further, when the formation of the second solid electrolyte layer 40 is started after forming the first solid electrolyte layer 30, the formation of the layer may be performed by gradually changing the treatment atmosphere from the atmosphere containing no nitrogen gas to the atmosphere containing nitrogen gas. By doing this, the content of nitrogen in the second solid electrolyte layer 40 can be gradually changed. The changing amount or the changing ratio at this time can be controlled freely by the concentration of nitrogen gas, the substitution speed of gas, or the like.

[7] Subsequently, the positive electrode current collector 12 is bonded to the lower surface 148 of the positive electrode active material layer 14.

The bonding of the positive electrode current collector 12 may be performed by bonding the positive electrode current collector 12 formed as a separate body to the lower surface 148 of the positive electrode active material layer 14, or by depositing the above-mentioned forming material of the positive electrode current collector 12 on the lower surface 148 of the positive electrode active material layer 14.

As the deposition method for the positive electrode current collector 12, various physical vapor phase deposition (PVD) methods and chemical vapor phase deposition (CVD) methods can be used.

[8] Subsequently, the negative electrode active material layer 24 is bonded to the upper surface of the second solid electrolyte layer 40.

The bonding of the negative electrode active material layer 24 may be performed by bonding the negative electrode active material layer 24 formed as a separate body to the upper surface of the second solid electrolyte layer 40, or by depositing the above-mentioned forming material of the negative electrode active material layer 24 on the upper surface of the second solid electrolyte layer 40.

As the deposition method for the negative electrode active material layer 24, various physical vapor phase deposition (PVD) methods and chemical vapor phase deposition (CVD) methods can be used.

[9] Subsequently, the negative electrode current collector 22 is bonded to the upper surface of the negative electrode active material layer 24.

The bonding of the negative electrode current collector 22 may be performed by bonding the negative electrode current collector 22 formed as a separate body to the upper surface of the negative electrode active material layer 24, or by depositing the above-mentioned forming material of the negative electrode current collector 22 on the upper surface of the negative electrode active material layer 24.

As the deposition method for the negative electrode current collector 22, various physical vapor phase deposition (PVD) methods and chemical vapor phase deposition (CVD) methods can be used.

By undergoing the steps as described above, the lithium secondary battery 101 is produced.

Hereinabove, the solid electrolyte battery, the electrode assembly, the composite solid electrolyte, and the method for producing a solid electrolyte battery according to the invention have been described based on the embodiments shown in the drawings, however, the invention is not limited thereto.

For example, an arbitrary configuration may be added to each of the solid electrolyte battery according to the invention, the electrode assembly according to the invention, and the composite solid electrolyte according to the invention.

Further, in the method for producing a solid electrolyte battery according to the invention, one or more arbitrary steps may be added to the embodiments described above, or the order of the steps in the embodiments described above may be changed.

Further, the solid electrolyte battery according to the invention may have a configuration in which the configurations of the solid electrolyte battery according to two or more embodiments described above are arbitrarily combined.

EXAMPLES

Next, specific examples of the invention will be described.

1. Production of Lithium Secondary Battery

Example 1

<1> First, 100 parts by mass of $LiCoO_2$ (manufactured by Sigma-Aldrich Co., Ltd.) in the form of a powder and 3 parts by mass of polyacrylic acid (PAA) (manufactured by Sigma- Aldrich Co., Ltd.) as a pore-forming material in the form of a powder were mixed by grinding in a mortar.

<2> Subsequently, 80 mg of the resulting mixed powder was placed in a die with a diameter of 11 mm and molded into a disk-shaped pellet by pressing. The molded pellet was sintered by a heat treatment at 1000° C. for 8 hours in an alumina crucible in which a powder of $LiCoO_2$ was spread on the bottom thereof. In the heat treatment, the temperature increasing rate was set to 3° C./min and the temperature decreasing rate was set to 3° C./rain up to 500° C., whereby a porous positive electrode active material layer was formed. The thickness of the obtained positive electrode active material layer was about 300 μm.

<3> Subsequently, a propionic acid solution of lithium acetate, a propionic acid solution of lanthanum acetate 1.5-hydrate, zirconium butoxide, and a 2-butoxyethanol solution of niobium pentaethoxide were stirred at 90° C. for 30 minutes while heating. Thereafter, the mixture was gradually cooled to room temperature, whereby a solution of a precursor of $Li_{6.8}La_3Zr_{1.8}Nb_{0.2}O_{12}$ (hereinafter referred to as "LLZNb") was obtained. In the preparation of the precursor solution, the raw materials were weighed so that the atoms of the respective elements were contained at the compositional ratio of the compositional formula of LLZNb.

<4> Subsequently, the positive electrode active material layer obtained in the above step <2> was impregnated with this precursor solution, followed by drying at 60° C., and then further heating to 200° C., whereby the precursor of LLZNb was adhered to the positive electrode active material layer. The operation from the impregnation of the positive electrode active material layer with the precursor solution to the heating to 200° C. was repeated until the mass of the precursor adhered to the positive electrode active material layer reached the set amount of 15 mg.

<5> Subsequently, both surfaces facing each other of the positive electrode active material layer having the precursor adhered thereto were mechanically polished, whereby the positive electrode active material was exposed on the polished surfaces.

<6> Subsequently, the entirety of the positive electrode active material layer was fired at 800° C. by heating, whereby a composite body in which a third solid electrolyte layer was formed on the surface of the disk-shaped positive electrode active material layer was obtained.

<7> Subsequently, on the surface of the obtained composite body, 20 mg of a powder of $Li_{2.2}C_{0.8}B_{0.2}O_3$ which is a fourth inorganic solid electrolyte was placed.

<8> Subsequently, the composite body with the powder placed thereon was heated at 700° C. for 10 minutes. By doing this, the powder was melted, and the resulting molten material was impregnated into the composite body.

<9> Subsequently, the molten material was solidified by natural heat dissipation. By doing this, the molten material was solidified, whereby the fourth solid electrolyte layer was formed.

<10> Subsequently, on one surface of the positive electrode active material layer, a film of $Li_3BO_3$ having an average thickness of 1 μm was formed by a sputtering method. By doing this, a first solid electrolyte layer was obtained.

<11> Subsequently, on the first solid electrolyte layer, a film of $Li_3BO_{2.8}N_{0.2}$ having an average thickness of 1 μm was formed by a reactive sputtering method. By doing this, a second solid electrolyte layer was obtained.

Incidentally, the formation of the first solid electrolyte layer and the formation of the second solid electrolyte layer were performed without taking out the material under treatment from the treatment chamber.

<12> Subsequently, an aluminum plate as a positive electrode current collector was attached to the other surface of the positive electrode active material layer, whereby a positive electrode was formed. On the other hand, on the second solid electrolyte layer, a lithium metal foil and a copper foil were stacked in this order, and these were press-bonded to each other, whereby a negative electrode was formed.

In this manner, a lithium secondary battery was obtained.

Example 2

A lithium secondary battery was obtained in the same manner as in Example 1 except that the formation of the third solid electrolyte layer and the formation of the fourth solid electrolyte layer were omitted.

Example 3

A lithium secondary battery was obtained in the same manner as in Example 1 except that in place of $Li_3BO_{2.8}N_{0.2}$, $Li_3BO_{2.6}N_{0.4}$ was used as the forming material of the second solid electrolyte layer.

Example 4

A lithium secondary battery was obtained in the same manner as in Example 1 except that in place of $Li_3BO_3$, $Li_{2.2}C_{0.8}B_{0.2}O_3$ was used as the forming material of the first solid electrolyte layer.

Example 5

A lithium secondary battery was obtained in the same manner as in Example 1 except that in place of $Li_3BO_{2.8}N_{0.2}$, $Li_{2.2}C_{0.8}B_{0.2}O_{2.8}N_{0.2}$ was used as the forming material of the second solid electrolyte layer.

Example 6

A lithium secondary battery was obtained in the same manner as in Example 1 except that in place of $Li_3BO_3$, $Li_3BO_3$—$Li_4SiO_4$ was used as the forming material of the first solid electrolyte layer.

Comparative Example 1

A lithium secondary battery was obtained in the same manner as in Example 1 except that the formation of the first solid electrolyte layer was omitted.

Comparative Example 2

A lithium secondary battery was obtained in the same manner as in Example 1 except that the formation of the second solid electrolyte layer was omitted.

Comparative Example 3

A lithium secondary battery was obtained in the same manner as in Example 1 except that the formation of the first solid electrolyte layer and the formation of the second solid electrolyte layer were omitted.

Comparative Example 4

A lithium secondary battery was obtained in the same manner as in Example 2 except that the formation of the first solid electrolyte layer was omitted.

Comparative Example 5

A lithium secondary battery was obtained in the same manner as in Example 2 except that the formation of the second solid electrolyte layer was omitted.

Comparative Example 6

A lithium secondary battery was obtained in the same manner as in Example 2 except that the formation of the first solid electrolyte layer and the formation of the second solid electrolyte layer were omitted.

2. Evaluation of Lithium Secondary Battery

With respect to each of the lithium secondary batteries of the respective Examples and Comparative Examples, the charge-discharge characteristics were evaluated as follows.

The charge-discharge characteristics were evaluated by evaluating the internal resistance of the lithium secondary battery which was measured using a multi-channel charge-discharge evaluation apparatus (HJ1001SD8, manufactured by Hokuto Denko Corporation). The measurement was performed under driving conditions of a constant current-constant voltage at a current density of 0.1 mA/cm$^2$ and an upper limit charge voltage of 4.2 V, and a constant current at a lower limit discharge voltage of 3.0 V.

As a result, it was confirmed that the internal resistance of each of the lithium secondary batteries of the respective Examples was smaller than that of the lithium secondary batteries of the respective Comparative Examples. In particular, the internal resistance in the case of Examples 1 to 5 was particularly small, and this tendency was more remarkable in the case of Examples 1 and 3. Accordingly, it is verified that each of the lithium secondary batteries of the respective Examples has a high output power.

What is claimed is:

1. A solid electrolyte battery comprising:
   a positive active material that is porous, the positive active material including a first metal multiple oxide and a communication hole, the first metal being constituted by at least one or more metal elements selected from a group consisting of alkali metal elements, Group 2 elements, aluminum, and silver;
   a negative active material;
   a first solid electrolyte layer in contact with the positive active material and between the positive active material and the negative active material, the first solid electrode layer extending into the communication hole and including at least the first metal and oxygen as constituent elements;
   a second solid electrolyte layer in contact with the negative active material between the positive active material and the negative active material, the second solid electrolyte layer including at least the first metal, nitrogen, and oxygen as constituent elements, the second solid electrolyte layer including a portion in which a content of nitrogen gradually increases from a surface on a first solid electrolyte layer side to a surface on a negative active material side of the solid electrolyte battery, the first solid electrolyte layer being in contact with the second solid electrolyte layer, the first solid electrolyte layer having a lesser content of nitrogen as a constituent element than the content of nitrogen in the second solid electrolyte layer.

2. The solid electrolyte battery according to claim 1, wherein
   the second solid electrolyte layer contains a metal oxide containing at least the first metal, and
   the metal oxide contains a nitrogen atom.

3. The solid electrolyte battery according to claim 1, wherein in the second solid electrolyte layer, the content of nitrogen on the surface in contact with the negative active material is 0.3 at % or more and 20 at % or less.

4. The solid electrolyte battery according to claim 1, wherein the first solid electrolyte layer does not contain nitrogen as a constituent element.

5. The solid electrolyte battery according to claim 1, wherein the first metal is lithium.

6. The solid electrolyte battery according to claim 5, wherein each of the first solid electrolyte layer and the second solid electrolyte layer further contains boron.

7. The solid electrolyte battery according to claim 5, wherein
   in the communication hole, a third solid electrolyte containing a solid electrolyte represented by $Li_{7-x}La_3(Zr_{2-x}M_x)O_{12}$ (wherein M represents at least one element selected from Nb, Sc, Ti, V, Y, Hf, Ta, Al, Si, Ga, Ge, Sn, and Sb, and X represents a real number of 0 or more and 2 or less) is provided in contact with the first solid electrolyte layer and the positive active material.

8. The solid electrolyte battery according to claim 7, wherein
   in the communication hole, a fourth solid electrolyte containing a solid electrolyte represented by $Li_{2+x}C_{1-x}B_xO_3$ (wherein X represents a real number more than 0 and 1 or less) is provided in contact with the first solid electrolyte layer and the positive active material.

9. An electrode assembly comprising:
   a positive active material that is porous, the positive active material including a first metal multiple oxide and a communication hole, the first metal being constituted by at least one or more metal elements selected from a group consisting of alkali metal elements, Group 2 elements, aluminum, and silver;
   a first solid electrolyte layer in contact with the positive active material, the first solid electrode layer extending into the communication hole and including at least the first metal and oxygen as constituent elements, the first solid electrolyte layer being void of nitrogen; and
   a second solid electrolyte layer in contact with the first solid electrolyte layer on the opposite side to the positive active material of the first solid electrolyte layer, the second solid electrolyte layer including the first metal, nitrogen, and oxygen as constituent elements, the second solid electrolyte layer including a portion in which a content of nitrogen gradually increases from a surface adjacent to the first solid electrolyte layer to a surface opposite from the surface adjacent to the first solid electrolyte layer, the first solid electrolyte layer having a lesser content of nitrogen as a constituent element than a content of nitrogen in the second solid electrolyte layer.

* * * * *